(12) United States Patent
Dubey et al.

(10) Patent No.: US 10,095,535 B2
(45) Date of Patent: Oct. 9, 2018

(54) STATIC ROUTE TYPES FOR LOGICAL ROUTERS

(71) Applicant: Nicira, Inc., Palo Alto, CA (US)

(72) Inventors: Ankur Dubey, Santa Clara, CA (US); Sreeram Ravinoothala, San Jose, CA (US); Ronghua Zhang, San Jose, CA (US); Xuan Zhang, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 206 days.

(21) Appl. No.: 15/011,430

(22) Filed: Jan. 29, 2016

(65) Prior Publication Data

US 2017/0126497 A1     May 4, 2017

Related U.S. Application Data

(60) Provisional application No. 62/249,250, filed on Oct. 31, 2015.

(51) Int. Cl.
    *G06F 15/177*     (2006.01)
    *G06F 9/455*     (2018.01)
    *H04L 12/24*     (2006.01)

(52) U.S. Cl.
    CPC ...... *G06F 9/45558* (2013.01); *H04L 41/0806* (2013.01); *G06F 2009/45595* (2013.01)

(58) Field of Classification Search
    CPC ......... H04L 45/02; H04L 45/54; H04L 45/64; H04L 45/74; H04L 45/586;

(Continued)

(56) References Cited

U.S. PATENT DOCUMENTS 5,504,921 A     4/1996     Dev et al.
5,550,816 A     8/1996     Hardwick et al.
(Continued)

FOREIGN PATENT DOCUMENTS

EP     1653688     5/2006
EP     3013006     4/2016
(Continued)

OTHER PUBLICATIONS

Agarwal, Sugam, et al., "Traffic Engineering in Software Defined Networks," 2013 192. Proceedings IEEE INFOCOM, Apr. 14, 2013, pp. 2211-2219, Bell Labs, Alcatel-Lucent, Holmdel, NJ, USA.

(Continued)

*Primary Examiner* — Farzana Huq
(74) *Attorney, Agent, or Firm* — Adeli LLP

(57) ABSTRACT

Some embodiments provide method for implementing a logical router of a logical network. The method receives a configuration for a first logical router. The configuration includes a static route for the first logical router. The method defines several routing components with separate routing tables for the logical router. The method adds a first route, having a first static route type, for the static route to the routing tables of at least a first subset of the routing components. Based on the connection of a second logical router to the first logical router, adding a second route, having a second static route type, to the routing tables of at least a second subset of the routing components.

18 Claims, 17 Drawing Sheets

(58) Field of Classification Search
CPC ............. H04L 41/0803; H04L 41/0806; H04L 41/0813; H04L 41/0886; H04L 41/0893; H04L 49/35
USPC ........................................................ 709/221
See application file for complete search history.

(56) References Cited

U.S. PATENT DOCUMENTS

| | | |
|---|---|---|
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,958,298 B2 | 2/2015 | Zhang et al. |
| 9,021,066 B1 | 4/2015 | Singh et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 * | 11/2016 | Traina ..................... H04L 29/06 |
| 9,503,321 B2 | 11/2016 | Neginhal et al. |
| 9,647,883 B2 | 5/2017 | Neginhal et al. |
| 9,787,605 B2 | 10/2017 | Zhang et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0189769 A1 | 8/2008 | Casado et al. |
| 2008/0225853 A1 | 9/2008 | Melman et al. |

(56) References Cited

U.S. PATENT DOCUMENTS

| | | |
|---|---|---|
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1* | 2/2013 | Koponen ............... H04L 47/12 370/254 |
| 2013/0044641 A1 | 2/2013 | Koponen et al. |
| 2013/0051399 A1* | 2/2013 | Zhang .................... H04L 47/12 370/401 |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1* | 10/2013 | Qu ........................ H04L 45/74 370/395.53 |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0063360 A1 | 3/2015 | Thakkar et al. |
| 2015/0089082 A1 | 3/2015 | Patwardhan et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0294612 A1 | 10/2016 | Ravinoothala et al. |
| 2016/0344586 A1 | 11/2016 | Ganichev et al. |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |
| 2017/0230241 A1 | 8/2017 | Neginhal et al. |
| 2018/0006943 A1 | 1/2018 | Dubey |

FOREIGN PATENT DOCUMENTS

| | | |
|---|---|---|
| JP | 2003069609 | 3/2003 |
| JP | 2003124976 | 4/2003 |
| JP | 2003318949 | 11/2003 |
| WO | 2005112390 | 11/2005 |
| WO | 2008095010 | 8/2008 |
| WO | 2013184846 | 12/2013 |

OTHER PUBLICATIONS

Lowe, Scott, "Learning NSX, Part 14: Using Logical Routing," Scott's Weblog: The weblog of an IT pro specializing in virtualization, networking, open source, and cloud computing, Jun. 20, 2014, 8 pages, available at http://blog.scottlowe.org/2014/06/20/learning-nsx-part-14-using-logical-routing/.

Fernando, Cisco, R., et al., "Service Chaining using Virtual Networks with BGP," Internet Engineering Task Force, IETF, Jul. 7, 2015, pp. 1-32, Internet Society (ISOC), Geneva, Switzerland, available at https://tools.ietf.org/html/draft-fm-bess-service-chaining-01.

(56) References Cited

OTHER PUBLICATIONS

Aggarwal, R. et al., "Data Center Mobility based on E-VPN, BGP/MPLS IP VPN, IP Routing and NHRP; draft-raggarwa-data-center-mobility-05-txt," Jun. 10, 2013, 24 pages, Internet Engineering Task Force, IETF, Standardworkingdraft, Internet Society (ISOC) 4, Rue Des Falaises CH-1205, Geneva, Switzerland.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation, Apr. 2005, 14 pages, USENIX Association.

Dobrescu, Mihai, et al., "RouteBricks: Exploiting Parallelism to Scale Software Routers," SOSP '09, Proceedings of the ACM SIGOPS 22nd Symposium on Operating Systems Principles, Oct. 2009, 17 pages, ACM New York, NY.

Dumitriu, Dan Mihai, et al. (U.S. Appl. No. 61/514,990), "Method and Apparatus for Computing", filed Aug. 4, 2011, 31 pages.

Handley, Mark, et al., "Designing Extensible IP Router Software," Proc. of NSDI, May 2005, 14 pages.

Kim, Changhoon, et al., "Revisiting Route Caching: The World Should be Flat," in Proc. of PAM, Month Unknown, 10 pages.

Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

Lakshminarayanan, Karthik, et al., "Routing as a Service," Month Unknown, 2004, 15 pages, Berkeley, California.

Maltz, David A., et al., "Routing Design in Operational Networks: A Look from the Inside," SIGCOMM '04, Aug. 30-Sep. 3, 2004, 14 pages, ACM, Portland, Oregon, USA.

Pelissier, Joe, "Network Interface Virtualization Review," Jan. 2009, 38 pages.

Rosen, E., et al., "Applicability Statement for BGPMPLS IP Virtual Private Networks (VPNs)," The Internet Society, RFC 4365, Feb. 2006, 32 pages.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 2013, 15 pages, IEEE.

Wang, Yi, et al., "Virtual Routers on the Move: Live Router Migration as a Network-management Primitive," SIGCOMM 08, Aug. 17-22, 2008, 12 pages, ACM, Seattle, Washington, USA.

Vmware, Inc., "Vmware® NSX Network Virtualization Design Guide," 2013, 32 pages, Item No. VMW-NSX-NTWK-VIRT-DESN-GUIDE-V2-101, Palo Alto, CA, USA.

* cited by examiner

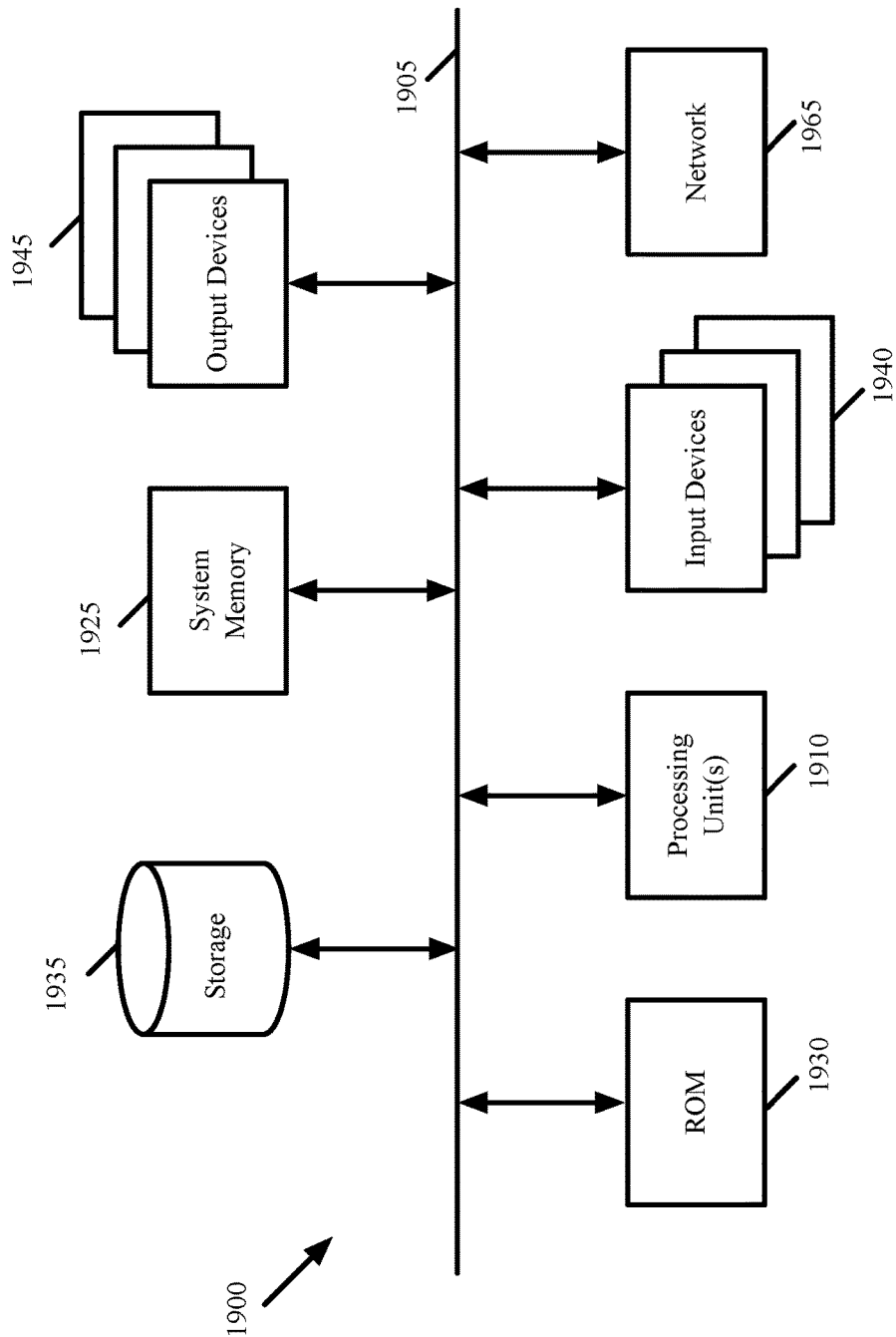

STATIC ROUTE TYPES FOR LOGICAL ROUTERS

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine.

In logical networks, user-defined data compute nodes (e.g., virtual machines) on different subnets may need to communicate with each other as well. In this case, tenants may define a network for virtualization that includes both logical switches and logical routers. Methods for implementing the logical routers to adequately serve such virtualized logical networks in datacenters are needed.

BRIEF SUMMARY

Some embodiments provide a method for implementing a logical router in a network (e.g., in a datacenter). In some embodiments, the method is performed by a management plane that receives configuration data from an administrator and converts that configuration data into a desired network state and/or a central control plane that performs additional processing on the network state and distributes the desired network state as configuration data to forwarding elements (or to local control planes that directly manage the forwarding elements) that implement the logical network (including the logical router). The management plane and central control plane, in some embodiments, may both operate within a centralized network controller.

The management plane, in some embodiments, receives a definition of a logical router (e.g., through an application programming interface (API) and defines multiple routing components for the logical router. Each of these routing components is separately assigned a set of routes (e.g., a routing information base) and a set of logical interfaces.

In some embodiments, the several routing components defined for a logical router includes one distributed routing component and several centralized routing components. In addition, the management plane of some embodiments defines a logical switch for handling communications between the components internal to the logical router (referred to as a transit logical switch). The distributed routing component and the transit logical switch are implemented in a distributed manner by numerous machines within the datacenter, while the centralized routing components are each implemented on a single machine. Some embodiments implement the distributed components in the datapath of managed forwarding elements on the various machines, while the centralized routing components are implemented in VMs (or other data compute nodes) on their single machines. Other embodiments also implement the centralized components in the datapath of their assigned machine (e.g., in a datapath of a bare metal machine).

The centralized components, in some embodiments, may be configured in active-active or active-standby modes. In active-active mode, all of the centralized components are fully functional at the same time, and traffic can ingress or egress from the logical network through the centralized components using equal-cost multi-path (ECMP) forwarding principles (balancing the traffic across the various centralized components), so long as the connectivity of the centralized components to the external networks is the same across the components.

In some embodiments, the logical router is part of a two-tier logical network structure. The two-tier structure of some embodiments includes a single logical router for connecting the logical network to a network external to the datacenter (referred to as a provider logical router (PLR) and administrated by, e.g., the owner of the datacenter), and multiple logical routers that connect to the single logical router and do not separately communicate with the external network (referred to as tenant logical routers (TLRs) and administrated by, e.g., different tenants of the datacenter). Some embodiments implement the centralized components of the PLR in active-active mode whenever possible, and only use active-standby mode when stateful services (e.g., NAT, firewall, load balancer, etc.) are configured for the logical router. When the logical router is a TLR, some embodiments either use no centralized components or two centralized components in active-standby mode when stateful services are configured for the logical router.

The management plane of some embodiments additionally configures the routing tables for each of the logical router constructs (e.g., for the distributed component as well as for each centralized component). The configuration received by the management plane may include specifications of routes (e.g., static routes) for the logical router as well as connections of the logical router to other logical routers (e.g., connections of the TLRs to a PLR). Some embodiments automatically identify to which routing components' routing tables the received routes should be pushed, as well as how to propagate routes based on the connections with other logical routers. In addition, each route added to the routing table of a routing component has a route type (e.g., static route, connected route, etc.) as well as an administrative distance value. Administrative distance values are used in determining priorities between routes for the same network address or range of addresses.

Some embodiments additionally define a sub-type field for static routes, with different sub-types having different administrative distance values. For instance, some embodiments include static routes based on administrator configured static routes as a first sub-type having a first administrative distance value. Additionally, the connection of a logical switch directly to the logical router by an administrator results in a connected route in the routing table of the distributed component, as well as routes for the various centralized components. These routes for the centralized components are assigned a second static route sub-type in some embodiments, with a smaller default administrative distance value than the administrator-configured static routes. Lastly, when a TLR is connected to a PLR, some embodiments identify any logical switch subnets that are connected to the TLR and which should be advertised (via dynamic routing protocols) to the external network. In this case, rather than running a dynamic routing protocol between the two logical routers, the management plane (which is aware of both logical router configurations) automatically performs the route exchange while handling the fact that the PLR actually has separate routing tables for each of its separate routing components. Thus, the management plane adds routes for these logical networks to both the distributed routing component and each of the centralized routing components. These routes are classified as static routes of a third sub-type, having a larger administrative distance value than the administrator-configured static routes.

In some embodiments, the management plane generates these routing tables for the various routing components of the logical router, and passes this data to the central control plane. The central control plane of some embodiments is responsible for generating a forwarding information base (i.e., a set of final routes to use for forwarding packets) for each of the routing components based on the routing tables received from the management plane. To generate this forwarding information base, the central control plane identifies the route for each prefix with the lowest administrative distance (preferring connected routes above all other routes), then traverses the routing table to identify an output interface (output logical port) for each route remaining in the table. The central control plane then distributes the routing component data to local controllers operating at the forwarding elements that implement the logical routing components (e.g., a single local controller for each of the centralized routing components and numerous forwarding elements for the distributed routing component, including the local controller to which the centralized routing component configuration information was distributed).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 19 conceptually illustrates an electronic system with which some embodiments of the invention are implemented.

DETAILED DESCRIPTION

Figure 2:
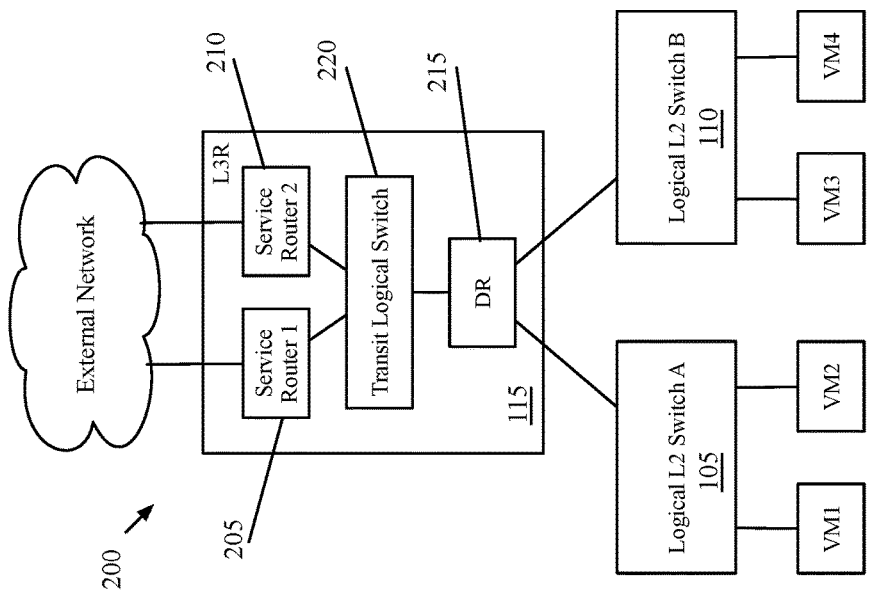
FIG. 2 illustrates a management plane view of the logical network of FIG. 1 when the logical router is implemented in a distributed manner.

Some embodiments provide a method for implementing a logical router in a network (e.g., in a datacenter). In some embodiments, the method is performed by a management plane that receives configuration data from an administrator and converts that configuration data into a desired network state and/or a central control plane that performs additional processing on the network state and distributes the desired network state as configuration data to forwarding elements (or to local control planes that directly manage the forwarding elements) that implement the logical network (including the logical router). The management plane and central control plane, in some embodiments, may both operate within a centralized network controller.

The management plane, in some embodiments, receives a definition of a logical router (e.g., through an application programming interface (API) and defines multiple routing components for the logical router. Each of these routing components is separately assigned a set of routes (e.g., a routing information base) and a set of logical interfaces.

In some embodiments, the several routing components defined for a logical router includes one distributed routing component and several centralized routing components. In addition, the management plane of some embodiments defines a logical switch for handling communications between the components internal to the logical router (referred to as a transit logical switch). The distributed routing component and the transit logical switch are implemented in a distributed manner by numerous machines within the datacenter, while the centralized routing components are each implemented on a single machine. Some embodiments implement the distributed components in the datapath of managed forwarding elements on the various machines, while the centralized routing components are implemented in VMs (or other data compute nodes) on their single machines. Other embodiments also implement the centralized components in the datapath of their assigned machine (e.g., in a datapath of a bare metal machine).

The centralized components, in some embodiments, may be configured in active-active or active-standby modes. In active-active mode, all of the centralized components are fully functional at the same time, and traffic can ingress or egress from the logical network through the centralized components using equal-cost multi-path (ECMP) forwarding principles (balancing the traffic across the various centralized components), so long as the connectivity of the centralized components to the external networks is the same across the components.

In some embodiments, the logical router is part of a two-tier logical network structure. The two-tier structure of some embodiments includes a single logical router for connecting the logical network to a network external to the datacenter (referred to as a provider logical router (PLR) and administrated by, e.g., the owner of the datacenter), and multiple logical routers that connect to the single logical router and do not separately communicate with the external network (referred to as tenant logical routers (TLRs) and administrated by, e.g., different tenants of the datacenter). Some embodiments implement the centralized components of the PLR in active-active mode whenever possible, and only use active-standby mode when stateful services (e.g., NAT, firewall, load balancer, etc.) are configured for the logical router. When the logical router is a TLR, some embodiments either use no centralized components or two centralized components in active-standby mode when stateful services are configured for the logical router.

The management plane of some embodiments additionally configures the routing tables for each of the logical router constructs (e.g., for the distributed component as well as for each centralized component). The configuration received by the management plane may include specifications of routes (e.g., static routes) for the logical router as well as connections of the logical router to other logical routers (e.g., connections of the TLRs to a PLR). Some embodiments automatically identify to which routing components' routing tables the received routes should be pushed, as well as how to propagate routes based on the connections with other logical routers. In addition, each route added to the routing table of a routing component has a route type (e.g., static route, connected route, etc.) as well as an administrative distance value. Administrative distance values are used in determining priorities between routes for the same network address or range of addresses.

Some embodiments additionally define a sub-type field for static routes, with different sub-types having different administrative distance values. For instance, some embodiments include static routes based on administrator configured static routes as a first sub-type having a first administrative distance value. Additionally, the connection of a logical switch directly to the logical router by an administrator results in a connected route in the routing table of the distributed component, as well as routes for the various centralized components. These routes for the centralized components are assigned a second static route sub-type in some embodiments, with a smaller default administrative distance value than the administrator-configured static routes. Lastly, when a TLR is connected to a PLR, some embodiments identify any logical switch subnets that are connected to the TLR and which should be advertised (via dynamic routing protocols) to the external network. In this case, rather than running a dynamic routing protocol between the two logical routers, the management plane (which is aware of both logical router configurations) automatically performs the route exchange while handling the fact that the PLR actually has separate routing tables for each of its separate routing components. Thus, the management plane adds routes for these logical networks to both the distributed routing component and each of the centralized routing components. These routes are classified as static routes of a third sub-type, having a larger administrative distance value than the administrator-configured static routes.

In some embodiments, the management plane generates these routing tables for the various routing components of the logical router, and passes this data to the central control plane. The central control plane of some embodiments is responsible for generating a forwarding information base (i.e., a set of final routes to use for forwarding packets) for each of the routing components based on the routing tables received from the management plane. To generate this forwarding information base, the central control plane identifies the route for each prefix with the lowest administrative distance (preferring connected routes above all other routes), then traverses the routing table to identify an output interface (output logical port) for each route remaining in the table. The central control plane then distributes the routing component data to local controllers operating at the forwarding elements that implement the logical routing components (e.g., a single local controller for each of the centralized routing components and numerous forwarding elements for the distributed routing component, including the local controller to which the centralized routing component configuration information was distributed).

The above introduces the concept of a two-tiered logical router configuration as well as the management plane assignment of route types and sub-types and the central control plane routing information base generation. In the following, Section I focuses on the overall high-level design of the logical router of some embodiments, while Section II describes the configuration of the various logical router components and their respective routing information bases by the management plane. Section III then describes the conversion of the routing information bases to forwarding information bases for these logical router components. Finally, Section IV describes the electronic system with which some embodiments of the invention are implemented.

I. Logical Router and Physical Implementation

The following discussion describes the design of logical routers for some embodiments as well as the implementation of such logical routers by the network controllers of some embodiments. Logical routers, in some embodiments, exist in three different forms. The first of these forms is the API view, or configuration view, which is how the logical router is defined by a user (e.g., a datacenter provider or tenant). The second view is the control plane, or management plane, view, which is how the network controller internally defines the logical router. Finally, the third view is the physical realization, or implementation of the logical router, which is how the logical router is actually implemented in the datacenter. That is, the logical router is an abstraction describing a set of functionalities (e.g., routing, NAT, etc.) that a user configures for the logical router. The logical router is then implemented by various machines in the datacenter based on instructions distributed to those machines by a set of network controllers, with the instructions generated by the network controllers according to the configuration provided by the user.

In the management plane/control plane view (referred to herein as the management plane view), the logical router of some embodiments may include one or both of a single DR and one or more SRs. The DR, in some embodiments, spans managed forwarding elements (MFEs) that couple directly to VMs or other data compute nodes that are logically connected, directly or indirectly, to the logical router. The DR of some embodiments also spans the gateways to which the logical router is bound. The DR, in some embodiments, is responsible for first-hop distributed routing between logical switches and/or other logical routers that are logically connected to the logical router. The SRs of some embodiments are responsible for delivering services that are not implemented in a distributed fashion (e.g., some stateful services).

In some embodiments, the physical realization of a logical router always has a DR (i.e., for first-hop routing). A logical router will have SRs if either (i) the logical router is a PLR, and therefore connects to external physical networks or (ii) the logical router has services configured that do not have a distributed implementation (e.g., NAT, load balancing, DHCP in some embodiments). Even if there are no stateful services configured on a PLR, some embodiments use SRs in the implementation to centralized the connection to the external network.

A. Single-Tier Logical Router

Figure 1:
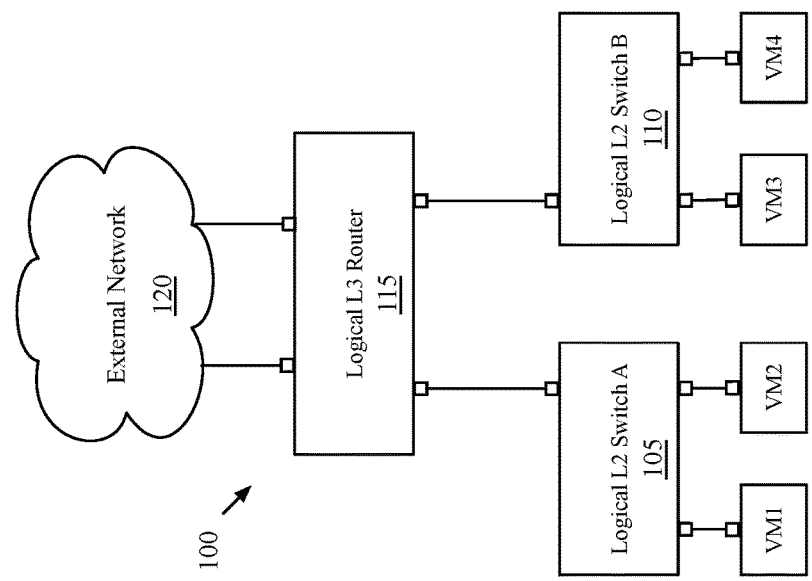
FIG. 1 illustrates a configuration view of a logical router, which represents a logical network as designed by a user.
Figure 3:
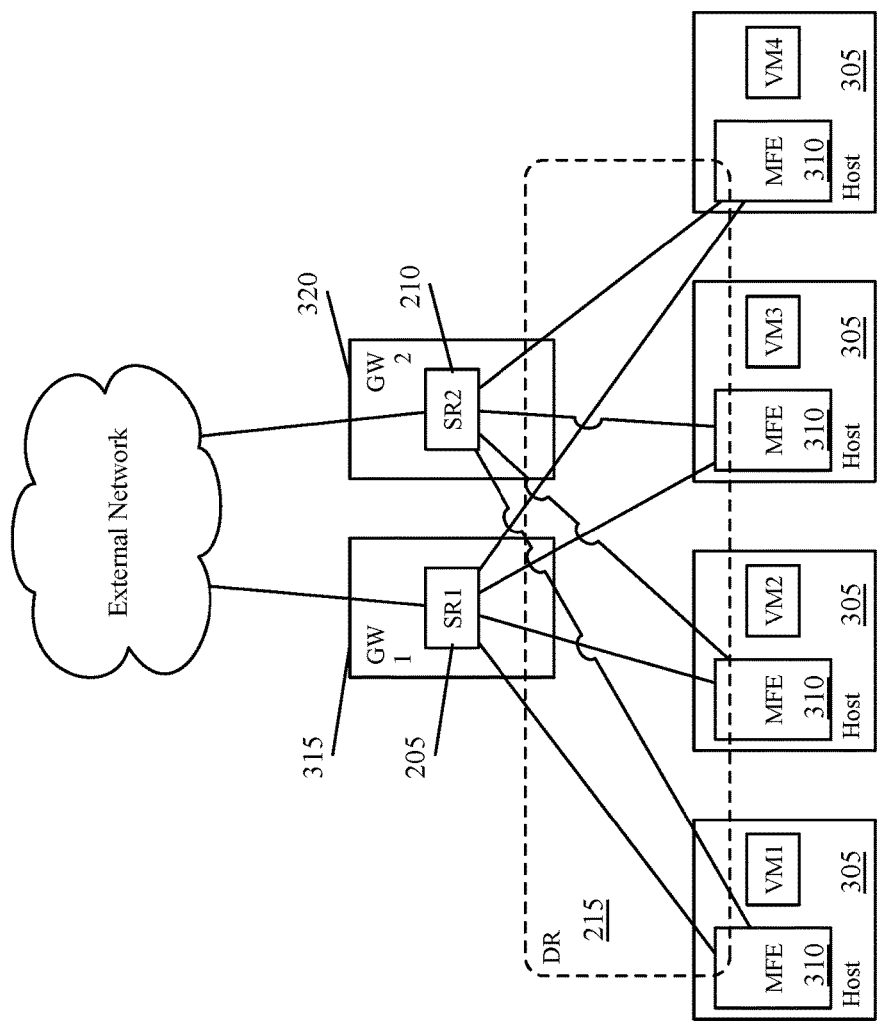
FIG. 3 illustrates a physical distributed implementation of the logical router of FIG. 1.

FIGS. 1-3 illustrate the three different views of a distributed logical router implementation. FIG. 1 specifically illustrates the configuration view, which represents a logical network 100 as designed by a user. As shown, the logical router 115 is part of a logical network 100 that includes the logical router 115 and two logical switches 105 and 110. The two logical switches 105 and 110 each have VMs that connect to logical ports. While shown as VMs in these figures, it should be understood that other types of data compute nodes (e.g., namespaces, etc.) may connect to logical switches in some embodiments. The logical router 115 also includes two ports that connect to the external physical network 120.

FIG. 2 illustrates the management plane view 200 of the logical network 100. The logical switches 105 and 110 are the same in this view as the configuration view, but the network controller has created two service routers 205 and 210 for the logical router 115, as well as a distributed router 215 and a transit logical switch 220. The DR 215 includes a southbound interface for each of the logical switches 105 and 110, and a single northbound interface to the transit logical switch 220 (and through this to the SRs). The SRs 205 and 210 each include a single southbound interface to the transit logical switch 220 (used to communicate with the DR 215, as well as each other in certain situations). Each SR 205 and 210 also corresponds to an uplink port of the logical router (that connects to the external network), and thus each of the SRs has a single such interface.

The detailed configuration of the northbound and southbound interfaces of the various router constructs 205-215 and their connections with the transit logical switch 220 will be described in further detail below. In some embodiments, the management plane generates separate routing information bases (RIBs) for each of the router constructs 205-215, and the central control plane subsequently generates forwarding information bases (FIBs) for each of the router constructs 205-215. That is, in addition to having separate objects created in the management/control plane, each of the router constructs 205 is treated as a separate router with separate routes.

Finally, FIG. 3 illustrates a physical implementation of the logical router 100. As shown, each of the VMs that couples to one of the logical switches 105 and 110 in the logical network 100 resides on a host machine 305. The MFEs 310 that operate on these host machines in some embodiments are virtual switches (e.g., Open vSwitch (OVS), ESX) that operate within the hypervisors or other virtualization software on the host machines. These MFEs perform first-hop switching and routing to implement the logical switches 105 and 110, and the logical router 115, for packets sent by the VMs of the logical network 100. The MFEs 310 (or a subset of them) also may implement logical switches (and distributed logical routers) for other logical networks if the other logical networks have VMs that reside on the host machines 305 as well.

The two SRs 205 and 210 each operate on a different gateway machine 315 and 320. The gateway machines 315 and 320 are host machines similar to the machines 305 in some embodiments, but host SRs rather than user VMs. In some embodiments, the gateway machines 315 and 320 each include an MFE as well as the SR, in order for the MFE to handle logical switching as well as routing for the DR 215. For instance, packets sent from the external network 120 may be routed by the SR routing table on one of the gateway machines and then subsequently switched and routed (according to the DR routing table) by the MFE on the same gateway.

The SRs may be implemented in a namespace, a virtual machine, or as a VRF in different embodiments. In some embodiments, the SRs are implemented within the datapath of the MFE rather than as a separate entity on the host machine with the MFE. The SRs may operate in an active-active or active-standby mode in some embodiments, depending on whether any stateful services (e.g., firewalls) are configured on the logical router. When stateful services are configured, some embodiments require only a single active SR. In some embodiments, the active and standby service routers are provided with the same configuration, but the MFEs 310 are configured to send packets via a tunnel to the active SR (or to the MFE on the gateway machine with the active SR). Only if the tunnel is down will the MFE send packets to the standby gateway.

B. Multi-Tier Topology

Figure 4:
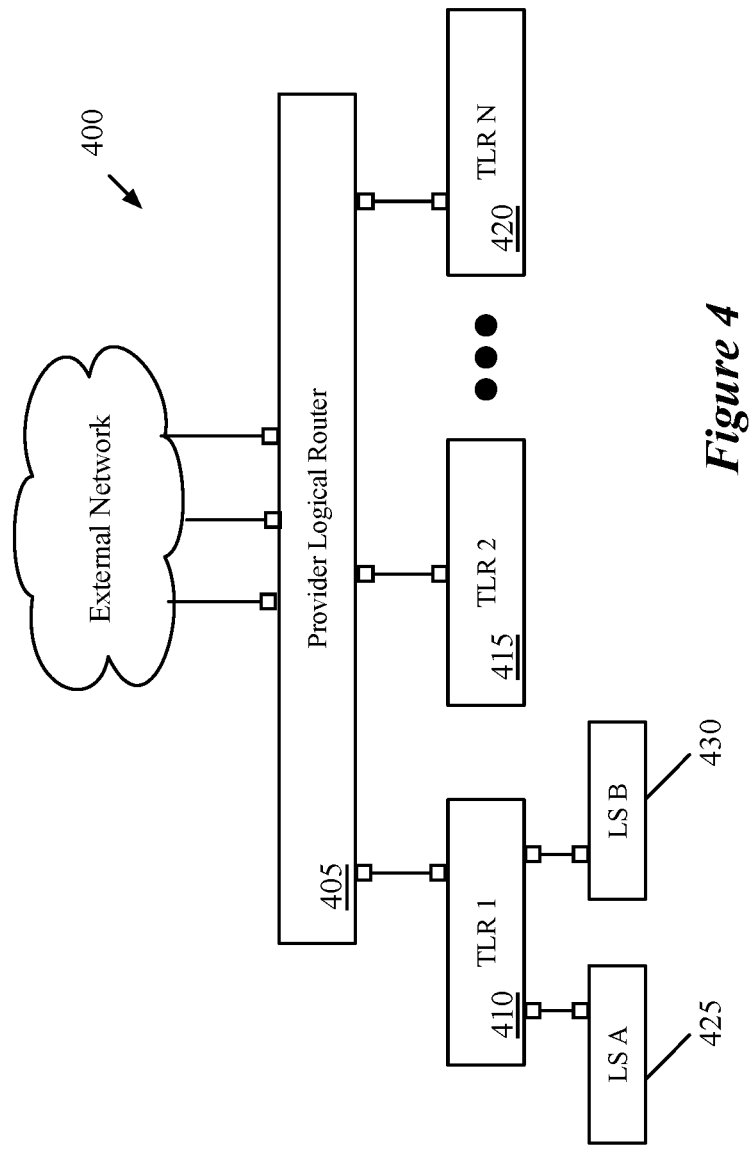
FIG. 4 conceptually illustrates a logical network with two tiers of logical routers.

The previous example illustrates only a single tier of logical router. For logical networks with multiple tiers of logical routers, some embodiments may include both DRs and SRs at each level, or DRs and SRs at the upper level (the PLR tier) with only DRs at the lower level (the TLR tier). FIG. 4 conceptually illustrates a multi-tier logical network 400 of some embodiments, with FIGS. 5 and 6 illustrating two different management plane views of the logical networks.

FIG. 4 conceptually illustrates a logical network 400 with two tiers of logical routers. As shown, the logical network 400 includes, at the layer 3 level, a provider logical router 405 and several tenant logical routers 410-420. The first tenant logical router 410 has two logical switches 425 and 430 attached, with one or more data compute nodes coupling to each of the logical switches. For simplicity, only the logical switches attached to the first TLR 410 are shown, although the other TLRs 415-420 would typically have logical switches attached (to which data compute nodes couple).

In some embodiments, any number of TLRs may be attached to a PLR such as the PLR 405. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR (because, e.g., the routing table for the PLR might get too big, or only a certain number of interfaces are supported for the PLR, or too much traffic would be bottlenecked at the SRs of the PLR). Part of the routing table for a PLR includes routes for all of the logical switch domains of its TLRs, so attaching numerous TLRs to a PLR creates several routes for each TLR just based on the subnets attached to the TLR. The PLR 405, as shown in the figure, provides a connection to the external physical network 435; some embodiments only allow the PLR to provide such a connection, so that the datacenter provider can manage this connection. Each of the separate TLRs 410-420, though part of the logical network 400, are configured independently (although a single tenant could have multiple TLRs if they so chose).

Figure 5:
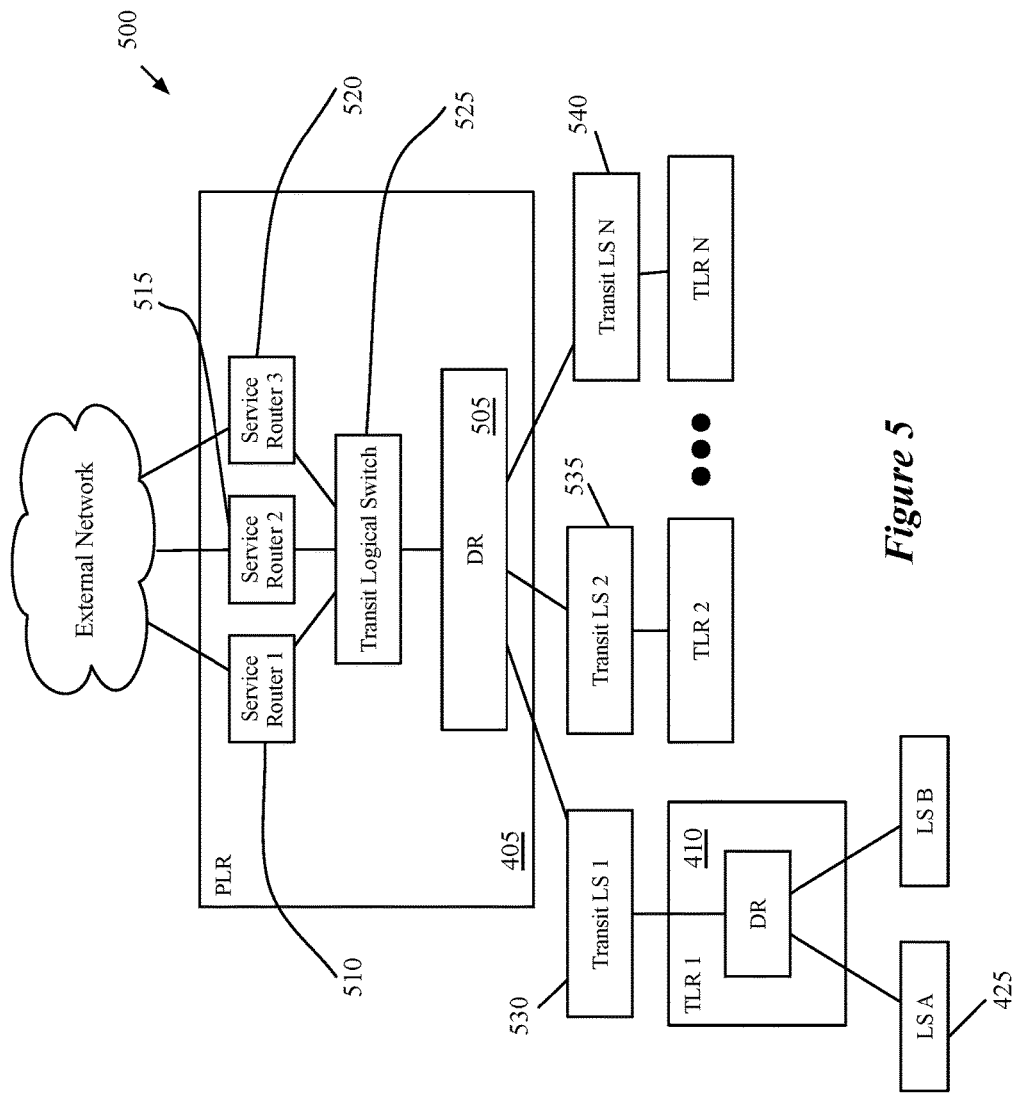
FIG. 5 illustrates the management plane view for the logical topology of FIG. 4 when a TLR in the logical network is completely distributed.
Figure 6:
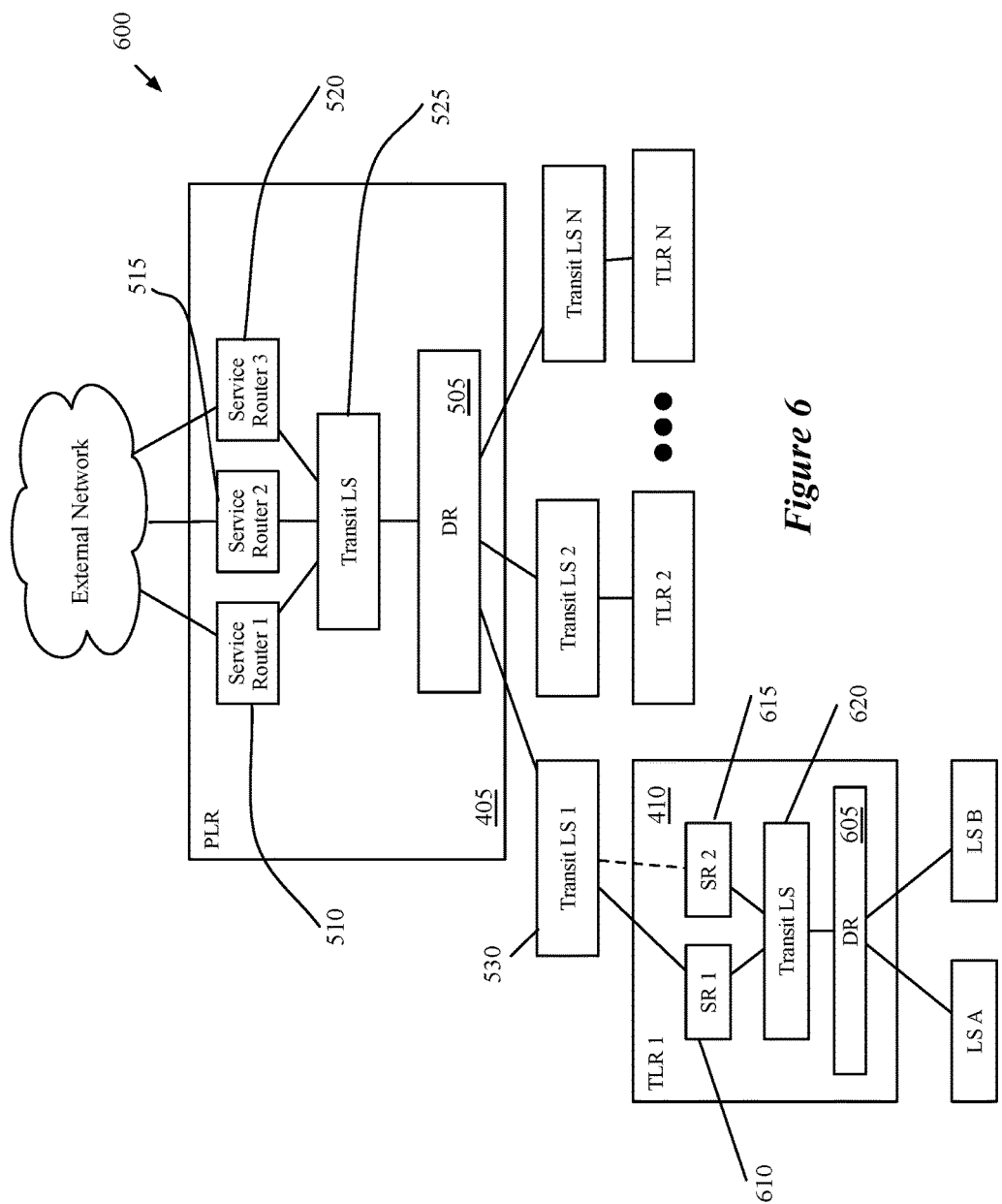
FIG. 6 illustrates the management plane view for the logical topology of FIG. 4 when the TLR in the logical network has a centralized component.

FIGS. 5 and 6 illustrate different possible management plane views of the logical network 400, depending on whether or not the TLR 405 includes a centralized component. In these examples, the routing aspects of the TLR 405 are always distributed using a DR. However, if the configuration of the TLR 405 includes the provision of stateful services, then the management plane view of the TLR (and thus the physical implementation) will include active and standby SRs for these stateful services.

Thus, FIG. 5 illustrates the management plane view 500 for the logical topology 400 when the TLR 405 is completely distributed. For simplicity, only details of the first TLR 410 are shown; the other TLRs will each have their own DR, as well as SRs in some cases. As in FIG. 2, the PLR 405 includes a DR 505 and three SRs 510-520, connected together by a transit logical switch 525. In addition to the transit logical switch 525 within the PLR 405 implementation, the management plane also defines separate transit logical switches 530-540 between each of the TLRs and the DR 505 of the PLR. In the case in which the TLR 410 is completely distributed (FIG. 5), the transit logical switch 530 connects to a DR 545 that implements the configuration of the TLR 410. Thus, as explained in greater detail in U.S. Provisional Application 62/110,061, filed Jan. 30, 2015, which is incorporated herein by reference, a packet sent to a destination in the external network by a data compute node attached to the logical switch 425 will be processed through the pipelines of the logical switch 425, the DR 545 of TLR 410, the transit logical switch 530, the DR 505 of the PLR 405, the transit logical switch 525, and one of the SRs 510-520. In some embodiments, all of the In some embodiments, the existence and definition of the transit logical switches 525 and 530-540 are hidden from the user that configures the network through the API (e.g., an administrator), with the possible exception of troubleshooting purposes.

FIG. 6 illustrates the management plane view 600 for the logical topology 400 when the TLR 405 has a centralized component (e.g., because stateful services that cannot be distributed are defined for the TLR). In some embodiments, stateful services such as firewalls, NAT, load balancing, etc. are only provided in a centralized manner. Other embodiments allow for some or all of such services to be distributed, however. As with the previous figure, only details of the first TLR 410 are shown for simplicity; the other TLRs may have the same defined components (DR, transit LS, and two SRs) or have only a DR as in the example of FIG. 5). The PLR 405 is implemented in the same manner as in the previous figure, with the DR 505 and the three SRs 510, connected to each other by the transit logical switch 525. In addition, as in the previous example, the management plane places the transit logical switches 530-540 between the PLR and each of the TLRs.

The partially centralized implementation of the TLR 410 includes a DR 605 to which the logical switches 425 and 430 attach, as well as two SRs 610 and 615. As in the PLR implementation, the DR and the two SRs each have interfaces to a transit logical switch 620. This transit logical switch serves the same purposes as the switch 525, in some embodiments. For TLRs, some embodiments implement the SRs in active-standby manner, with one of the SRs designated as active and the other designated as standby. Thus, so long as the active SR is operational, packets sent by a data compute node attached to one of the logical switches 425 and 430 will be sent to the active SR rather than the standby SR. In some embodiments, the transit logical switch 530 only includes a single port to connect to the TLR 410, and this port connects to the first SR 610, unless the SR fails and the connection moves to the second SR 615. As such, this connection is shown as a dashed line in the figure.

The above figures illustrate the management plane view of logical routers of some embodiments. In some embodiments, an administrator or other user provides the logical topology (as well as other configuration information) through an API. This data is provided to a management plane, which defines the implementation of the logical network topology (e.g., by defining the DRs, SRs, transit logical switches, etc.). In addition, in some embodiments a user associates each logical router (e.g., each PLR or TLR) with a set of physical machines (e.g., a pre-defined group of machines in the datacenter) for deployment. For purely distributed routers, such as the TLR 405 as implemented in FIG. 5, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. Described herein, an uplink is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once the user selects a group of machines for the logical router, if SRs are required for the logical router, the management plane assigns each of the uplinks of the logical router to a physical machine in the selected group of machines. The management plane then creates an SR on each of the machines to which an uplink is assigned. Some embodiments allow multiple uplinks to be assigned to the same machine, in which case the SR on the machine has multiple northbound interfaces.

As mentioned above, in some embodiments the SR may be implemented as a virtual machine or other container, or within the datapath of the MFE of the host machine to which the SR is assigned (e.g., as a VRF context). In some embodiments, the choice for the implementation of an SR may be based on the services chosen for the logical router and which type of SR best provides those services.

In addition, the management plane of some embodiments creates the transit logical switches. For each transit logical switch, the management plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 400), each of which may have its own transit logical switch. That is, in FIG. 6, transit logical switch 525 within the PLR implementation, transit logical switches 530-540 between the PLR and the TLRs, and transit logical switch 620 (as well as the transit logical switch within the implementation of any of the other TLRs) each require a unique subnet.

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

II. RIB Configuration for SR and DR

When a user configures a logical router (e.g., by configuring its interfaces and provisioning routes), this configuration is used by the management plane to configure the SRs and DR for the logical router. For instance, the logical router 115 of FIG. 1 has four interfaces (two to the logical switches, and two uplinks). However, its management plane implementation in FIG. 2 includes a DR with three interfaces and SRs with two interfaces each (a total of seven interfaces). The IP and MAC addresses and other configuration details assigned to the four interfaces as part of the logical router configuration are used to generate the configuration for the various components of the logical router.

In addition, as part of the configuration, the management plane of some embodiments generates a routing information base (RIB) for each of the logical router components. That is, although the administrator defines only a single logical router, the management plane generates separate RIBs for the DR and for each of the SRs. As described below, the central control plane of some embodiments converts this RIB into a forwarding information base (FIB) for each of the components. For the SRs of a PLR, in some embodiments the management plane generates the RIB initially (and the central control plane generates the FIB), but the physical implementation of the SR also runs a dynamic routing protocol process (e.g., BGP, OSPF, etc.) to supplement the routing table locally and perform the additional RIB to FIB conversion. In other embodiments, the central control plane does not generate even the initial FIB. Instead, the entire RIB is pushed to the SR (e.g., to the gateway host machine that hosts the SR), and a separate process operating on that gateway host machine (e.g., a local controller or other process) performs the RIB to FIB conversion.

Figure 7:
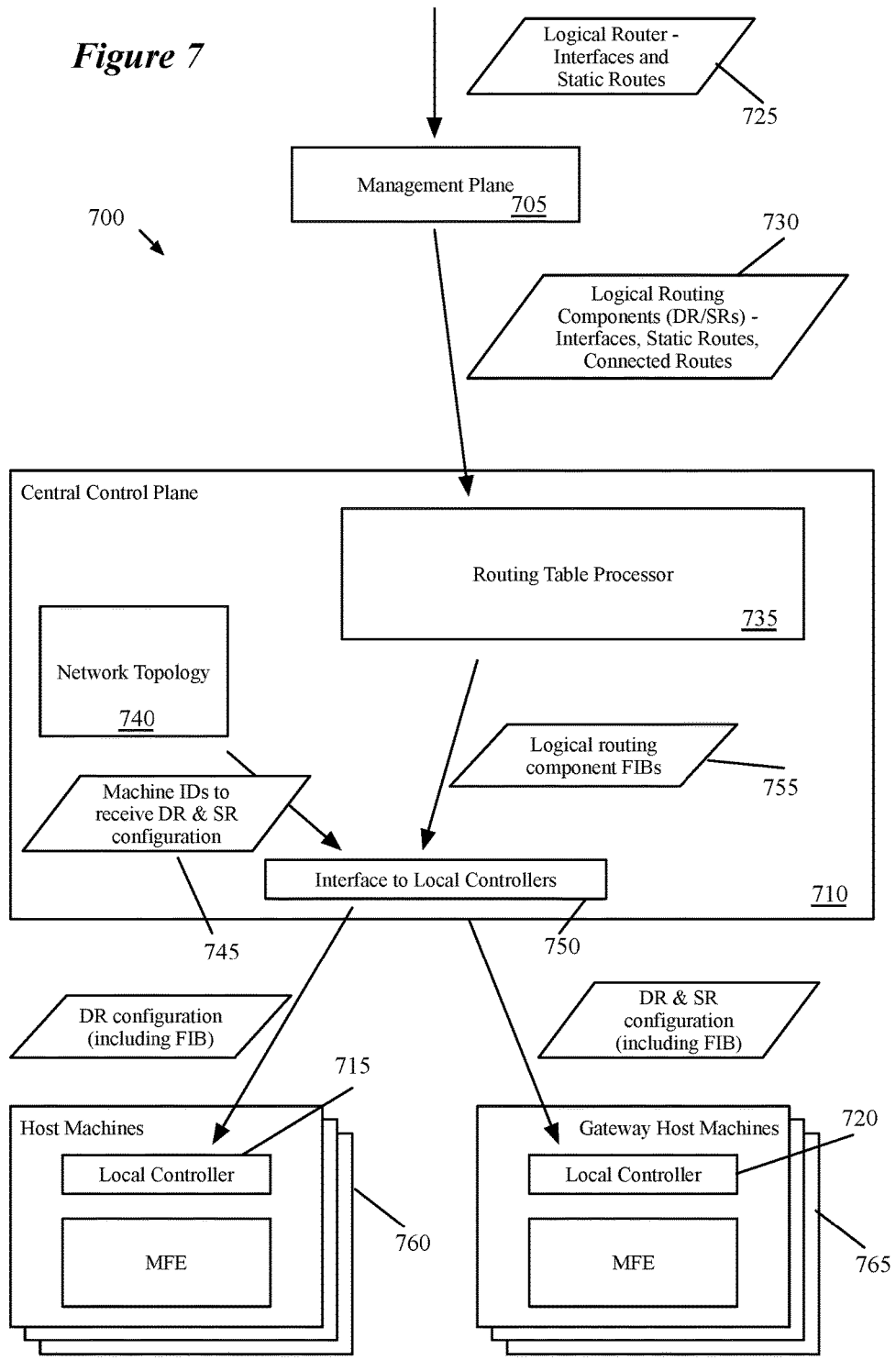
FIG. 7 conceptually illustrates the flow of configuration data for a logical router through a network control system of some embodiments.

FIG. 7 conceptually illustrates the flow of configuration data for a logical router through a network control system 700 of some embodiments. Specifically, the network control system illustrates a management plane 705, central control plane 710, local controllers 715 on host machines, and local controllers 720 on gateway host machines. In some embodiments, the management plane 705 and control plane 710 are both modules, or applications, on a single network controller machine. They may also be distributed, in that both the management plane and central control plane operate on numerous network controllers, with different controllers handling different logical router configurations (and other aspects of the logical network as well). In other embodiments, the management plane 705 and the central control plane 710 are implemented in separate machines. For instance, the network control system of some embodiments may have numerous management plane machines and numerous central control plane machines.

The management plane 705 of some embodiments is responsible for receiving a configuration 725 for a logical router (possibly with additional logical network configuration, such as the connection of other logical routers, logical switches, etc.) from an administrator and generating an internal configuration 730 for the logical router. In some embodiments, the management plane 705 receives the logical router configuration through an API accessible by administrators of the network managed by the network control system 700 (e.g., a datacenter administrator, a tenant network administrator, etc.).

As shown, the logical router configuration may include a set of interfaces for the logical router as well as administrator-defined static routes. For example, referring to FIG. 4, the management plane receives a configuration for PLR 205 that defines its three uplinks. The configuration for these uplinks might also include the physical connectivity; that is, the information regarding the physical routers each uplink connects to in the external network. In some embodiments, the configuration also includes the downlinks, which may or may not yet have tenant logical routers attached. When the tenant logical routers are attached, these connections are also processed by the management plane.

In addition to the interfaces of the logical router and its connections to other logical forwarding elements, the configuration 725 received by the management plane 705 may include static routes for the logical router. Static routes may be provided by the administrator, with the input including a prefix to be routed, a next hop, and in some cases an output interface. In use, any packet with a destination IP address that matches the prefix (and does not match a route with a longer prefix) will be output through the given interface to the given next hop address.

The management plane 705, as stated, converts this received configuration data 725 into a set of internal configuration data 730 for the logical router. As described below by reference to FIGS. 11 and 12, the management plane defines various routing components and interfaces for each of the routing components based on the received configuration data. For instance, for a PLR, configured downlinks (connecting to TLRs) are defined on the DR while SRs are defined for each uplink, with internal interfaces connecting to a transit logical switch (also defined by the management plane).

Figure 8:
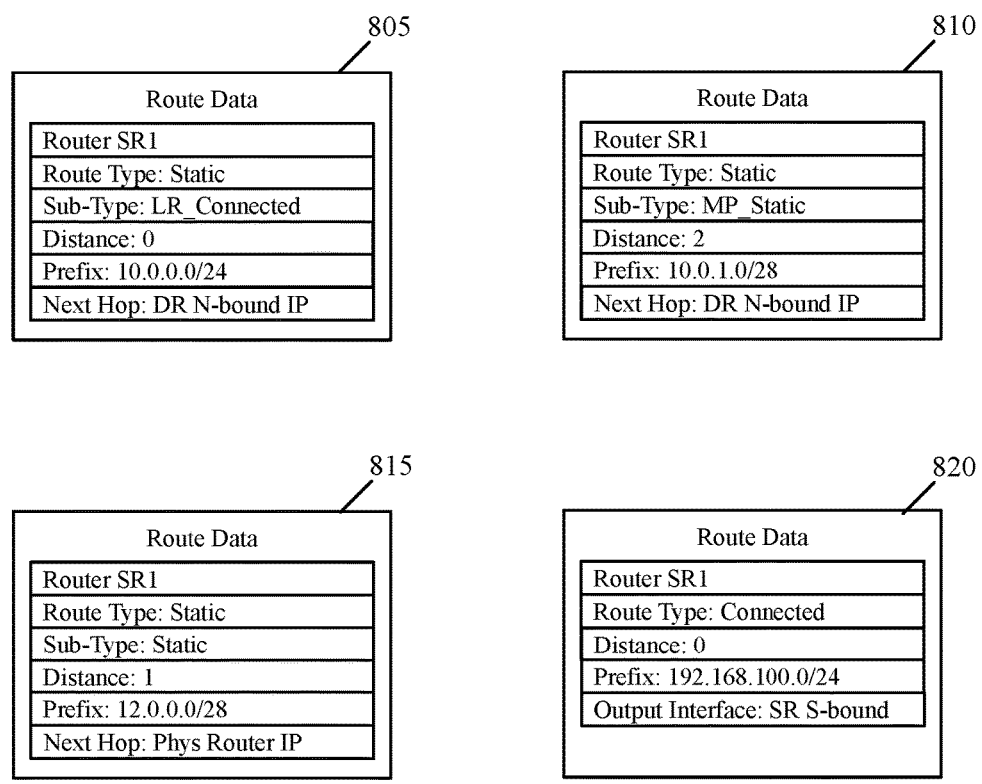
FIG. 8 conceptually illustrates data structures for each of four types of routes generated by the management plane.

The configuration 730 also includes routing tables (RIBs) for each of the routing components. For instance, some embodiments define a connected route for each interface of a routing component that connects to a logical switch. In addition, the management plane defines various types of static routes for the components, with different types of static routes having different administrative distances. All routes, in some embodiments, include administrative distance values, used to determine priority, with larger values indicating lower priority types of route (i.e., if two routes exist for the same prefix, the one with a lower distance value is used). If multiple routes for the same prefix are in the RIB with the same distance value, traffic to these prefixes is spread across the different routes (e.g., using ECMP principles to balance the traffic evenly). The following indicate the different types of routes, with default administrative distance values in parentheses:

connected (0): prefixes configured on the interfaces of the routing component static, sub-type logical router connected (0): routes on the SR components that correspond to connected routes on the DR static, sub-type static (1): routes configured by the administrator/user static, sub-type management plane static (2): TLRs may advertise routes (e.g., for their logical switches)—these routes are added to the components of the PLR to which the TLR connects static, sub-type TLR-NAT (2): TLRs may advertise NAT IPs (e.g., for their translated IPs for SNAT)—routes for these IP addresses are added to the components of the PLR to which the TLR connects static, sub-type PLR-NAT (2): PLRs may also perform NAT (e.g., to translate source addresses of outgoing packets to public IPs)—in some embodiments, routes for these IP addresses are added to the SRs with an output interface corresponding to the NAT service FIG. 8 conceptually illustrates data structures 805-820 for four of these types of routes generated by the management plane. In some embodiments, the management plane generates data structures for each route, and in this case all of the routes are for the routing table of a centralized routing component SR1. The first route 805, as shown, has a route type of static and a sub-type LR_connected. As such, the administrative distance for this route is 0, and it will have a preference over any routes except actual connected routes (with which there should not be any overlap for an SR). As shown, the routed prefix in this case is 10.0.0.0/24, which may correspond to a logical switch connected directly to the logical router of which SR1 is a component, and the automatically generated next hop IP address is the northbound IP address of the DR (that connects to the same transit logical switch as SR1).

The second route 810 has a route type of static and a sub-type of MP_static (management plane static). As such, the administrative distance for the route is 2. In this case, the prefix 10.0.1.0/28 is for an advertised route for a TLR that connects to the PLR. These routes are also added to the SR with the northbound IP address of the DR as the next hop. Similar routes with the type TLR-NAT would be added for NAT routes advertised by the TLR.

The third route 815 is a static route of sub-type static (i.e., a route added as a static route through the API by a user/administrator). This route has an administrative distance of 1, routes the prefix 12.0.0.0/28, and specifies a physical router IP address (outside the logical network) as its next hop. Finally, the last route 820 is a connected route. In general, each SR will have a connected route for its downlink interface that connects to a transit logical switch. In this case, the transit logical switch subnet is 192.168.100.0/24, and the route specifies an output interface (the downward-facing interface of the SR) rather than a next hop address.

In some embodiments, the administrative distances for each route are default values for the route type and sub-type. However, some embodiments allow the administrator to override these default values for specific routes, either for routes of sub-type static (when configuring the route initially) or for all static routes (including MP_static, TLR-NAT, PLR-NAT, and LR_connected routes).

Returning to FIG. 7, the internal configuration data from the management plane is passed to the central control plane 710. As shown, the central control plane includes (at least) a routing table processor 735 and a network topology module 740. The network topology module 205 uses stored network topology information to determine the machines within the physical network (e.g., datacenter) on which the logical router will need to be implemented. In some embodiments, this information is used to identify (or select) the gateway host machines on which each SR is implemented. In addition, each host machine on which a data compute node that attaches to a logical switch connected (directly or indirectly) to the logical router should receive the DR configuration, so that the MFE on that host machine can implement the DR. The network topology module 740 uses this data to provide a set of machine identifiers 745 (or other information that identifies the MFEs to receive each set of configuration data).

The routing table processor 735 of some embodiments converts the received RIBs (input routing tables) for the logical routing components into FIB data (output routing tables) that is used to configure the MFEs that implement the routing components. For a given routing component, the output routing table will have a maximum of one route for a particular network address prefix, using the administrative distances and route types to identify preference when a routing component has multiple routes for a particular prefix in its RIB. Some embodiments prefer connected routes, then select the static route for a prefix with the minimum administrative distance. Thus, LR-connected routes are preferred to all other types of static routes, with user-entered static routes preferred to MP_static, TLR-NAT, and PLR-NAT static routes (assuming default administrative distances).

In addition, the routing table processor 735 of some embodiments identifies a final action for each route, which is either a drop action (dropping packets sent to addresses matching the prefix) or an output interface. The routing table processor 735 performs recursive route traversal to identify these final actions. That is, the routing table processor 735, for each route that only has a next hop address, identifies the route in the routing table for that next hop address, and determines if an output interface or drop action is specified for that route. If such an action is specified, the action is applied to the original route. Otherwise, the process identifies another route in the table based on the next hop address of the second route, and continues on until it has identified an action to apply to the original route. The operations of the routing table processor will be described in greater detail below in Section III.

As shown, the routing table processor 735 outputs FIB data 755 for the logical routing components (SRs, DR), which is a routing table specifying actions for each route. This data, along with other logical network configuration data (e.g., logical switch configuration, ingress and egress ACL configurations for logical switches and routers, etc.), is sent to the local controllers 715 and 720 through the interface 750. The interface 750 with the local controllers, or a module separate from this interface, determines which MFEs need which configuration data using the machine ID information 745. The central control plane provides DR configuration information to local controllers 715 and 720 at both the appropriate host machines 760 (which host data compute nodes that send packets through the logical network to which this DR belongs) and the appropriate gateway host machines 765 at which the SRs are implemented. The SR configuration data, on the other hand, is only distributed to the local controllers 720 at the appropriate gateway host machines 765.

In should be noted that, in some embodiments, the local controllers at the SRs of the PLRs (that use dynamic routing protocols) merge the routing table configuration received from the central control plane with the routes learned from the physical routers (via the dynamic routing protocols). The SR locally calculates its FIB based on the incorporation of these dynamic routes in order to expedite route convergence, rather than sending the learned routes back to the centralized controller for recalculation.

A. DR Configuration

In some embodiments, the DR is always located on the southbound side (i.e., facing the data compute nodes of the logical network, rather than facing the external physical network) of the logical router implementation. Unless the logical router has no centralized component, the uplinks of the logical router will not be configured for the DR, whose northbound interfaces instead couple to the transit logical switch that is part of the logical router.

Figure 9:
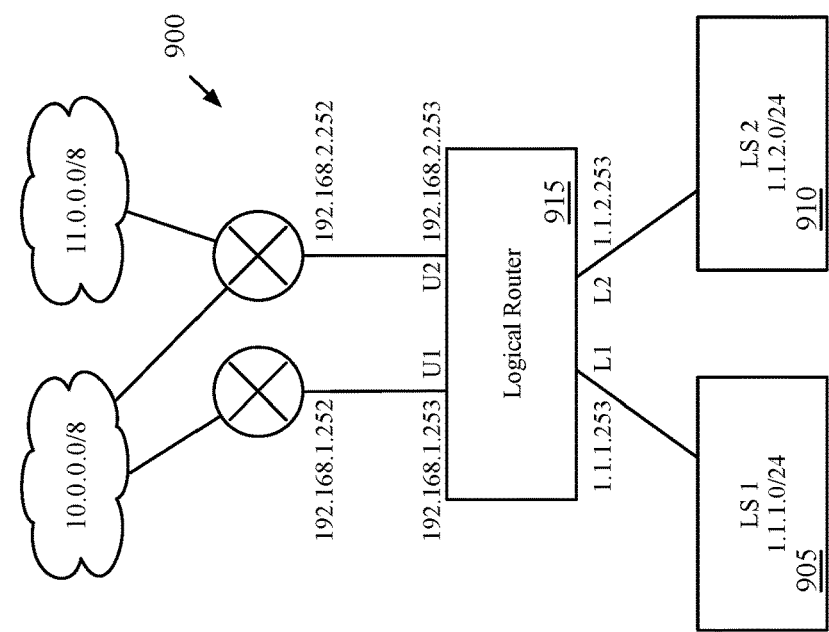
FIG. 9 conceptually illustrates a more detailed configuration of a logical network topology, including the network addresses and interfaces assigned by an administrator.

FIG. 9 conceptually illustrates the more detailed configuration of a logical network topology 900, including the network addresses and interfaces assigned by an administrator. As shown, the logical switches 905 and 910 are each assigned their own subnets, 1.1.1.0/24 and 1.1.2.0/24, and all of the data compute nodes attached to the logical switches 905 will have IP addresses in the corresponding subnet. The logical router 915 has an interface L1 to the first logical switch 905, with an IP address of 1.1.1.253 that is the default gateway for the data compute nodes in the subnet 1.1.1.0/24. The logical router 915 also has a second interface L2 to the second logical switch 910, with an IP address of 1.1.2.253 that is the default gateway for the data compute nodes in the subnet 1.1.2.0/24.

The northbound side of the logical router 915 has two uplinks, U1 and U2. The first uplink U1 has an IP address of 192.168.1.252 and connects to a first physical router 920 with an IP address of 192.168.1.252. The second uplink U2 has an IP address of 192.168.2.253 and connects to a second physical router 925 with an IP address of 192.168.2.252. The physical routers 920 and 925 are not actually part of the logical network, but rather connect the logical network to the external network. Though in the illustrated case each of the uplinks connects to a single, different physical router, in some cases each of the uplinks will connect to the same set of several physical routers. That is, both U1 and U2 might both connect to both of the physical routers 920 and 925. Some embodiments require that each of the external routers to which the uplinks connect provide the same connectivity, although this is not the case in the illustrated example. Instead, the first physical router 920 connects to the subnet 10.0.0.0/8, while the second router 925 connects to both the subnet 10.0.0.0/8 and 11.0.0.0/8.

For a logical router with a distributed component, some embodiments configure the DR as follows. The southbound interfaces are configured in the same way as the southbound interfaces of the logical router. These interfaces are those that connect to a logical switch in the logical topology, or to a lower-level logical router (e.g., the southbound interfaces of a PLR may connect to TLRs). The DR of some embodiments is allocated a single northbound interface, which is assigned an IP address and a MAC address. Assuming the logical router has one or more SRs, the northbound interface of the DR connects to a transit logical switch.

The RIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces may be user-defined logical domains to which data compute nodes connect, or transit logical switches located between the DR of a PLR and any TLRs that connect to the PLR.

In addition, any static routes that egress from an uplink of the logical router are included in the RIB of the DR. In some embodiments, these routes are added to the DR as configured by the user, while in other embodiments these routes are modified such that the next-hop IP address is set to that of the uplink's SR. For example, a static route "a.b.c.0/24 via 192.168.1.252" (192.168.1.252 being an address of an external physical network router) is modified to be "a.b.c.0/24 via [IP of SR southbound interface]". Static routes that egress from a southbound interface of the logical router, on the other hand, are included in the RIB of the DR unmodified. In some embodiments, for each SR of the logical router, a default route (i.e., a route for 0.0.0.0/0) is added to the RIB of the DR. In addition, in some embodiments, dynamic routes learned by a particular SR are added to the RIB of the DR. However, for TLRs, the SRs do not run a dynamic routing protocol in some embodiments.

Figure 10:
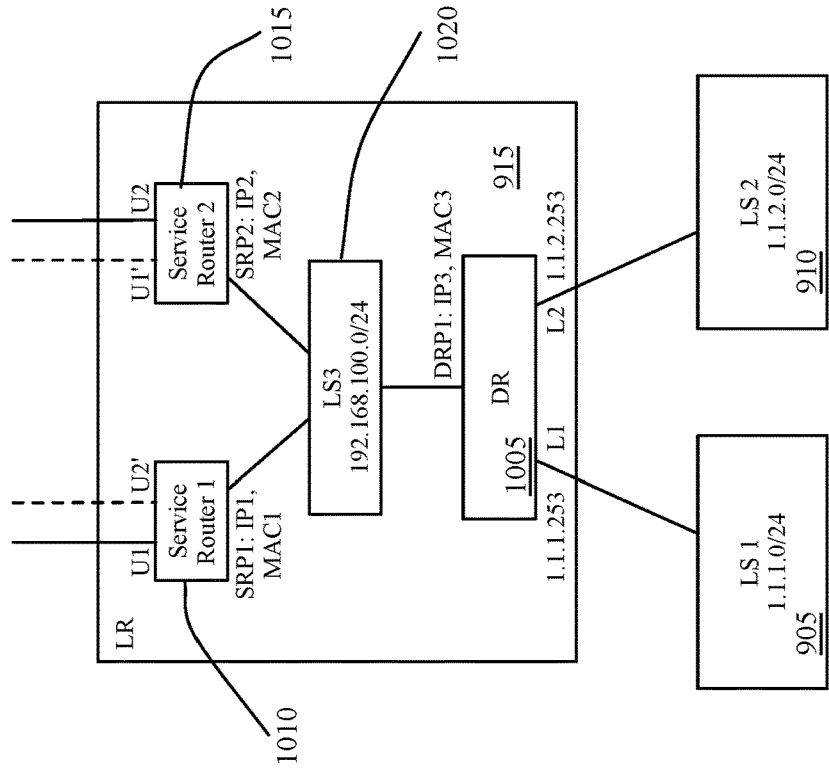
FIG. 10 illustrates the configuration of the logical topology of FIG. 9 by the management plane.

FIG. 10 illustrates the configuration 1000 of the logical topology 900 by the management plane. As shown, the logical switches 905 and 910 are configured as indicated by the user configuration. As in the previous examples, the logical router 915 includes a DR 1005, two SRs 1010 and 1015, and a transit logical switch 1020. The DR is assigned the two southbound interfaces of the logical router 905, which connect to the logical switches 905 and 910. The transit logical switch is assigned a subnet of 192.168.100.0/24, which needs to satisfy the requirement that it be unique among the logical switches that logically connect (directly or indirectly) to the logical router 905. Each of the three management plane router constructs 1005-1015 also includes an interface that connects to the transit logical switch, and has an IP address in the subnet of the transit logical switch. The northbound interfaces U1 and U2 are assigned to the two SRs 1010 and 1015, the configuration of which is described below.

Using the rules of some embodiments for generating the RIB, the RIB of the DR 1005 includes three connected routes, for the logical switch domains connected to the DR (1.1.1.0/24, 1.1.2.0/24, and 192.168.100.0/24). In addition, some embodiments include static connected routes for the subnets on which the uplinks are located, as well as any static routes configured by the administrator, and default routes pointing to both of the SR downlink IP addresses.

B. SR Configuration

As with the DR of a logical router, the management plane also configures each SR of the logical router with a separate RIB and interfaces. As described above, in some embodiments SRs of both PLRs and TLRs may deliver services (i.e., functionalities beyond simply routing, such as NAT, firewall, load balancing, etc.) and the SRs for PLRs also provide the connection between the logical network and external physical networks. In some embodiments, the implementation of the SRs is designed to meet several goals. First, the implementation ensures that the services can scale out—that is, the services assigned to a logical router may be delivered by any of the several SRs of the logical router. Second, some embodiments configure the SR in such a way that the service policies may depend on routing decisions (e.g., interface-based NAT). Third, the SRs of a logical router have the ability to handle failure (e.g., of the physical machine on which an SR operates, of the tunnels to that physical machine, etc.) among themselves without requiring the involvement of a centralized control plane or management plane (though some embodiments allow the SRs to operate at reduced capacity or in a suboptimal manner). Finally, the SRs ideally avoid unnecessary redirecting amongst themselves. That is, an SR should forward packets to the external physical network if it has the ability do so locally, only forwarding the packet to a different SR if necessary. Of course, the forwarding between SRs should avoid packet loops.

As shown in FIG. 10, each SR has one southbound interface that connects to the transit logical switch 1020 that resides between the SRs and the DR. In addition, in some embodiments, each SR has the same number of northbound interfaces as the logical router. That is, even though only one uplink may be assigned to the physical machine on which the SR operates, all of the logical router interfaces are defined on the SR. However, some of these interfaces are local interfaces while some of them are referred to as dummy interfaces.

The local northbound interfaces, in some embodiments, are those through which a packet can egress directly from the SR (e.g., directly to the physical network). An interface configured based on the uplink (or one of the uplinks) assigned to the SR is a local interface. On the other hand, an interface configured based on one of the other uplinks of the logical router assigned to a different SR is referred to as a dummy interface. Providing the SR with configuration for the dummy interfaces allows for the first-hop MFEs to send packets for any of the uplinks to any of the SRs, with that SR able to process the packets even if the packet is not destined for its local interface. Some embodiments, after processing a packet at one of the SRs for a dummy interface, forward the packet to the appropriate SR where that interface is local, in order for the other SR to forward the packet out to the external physical network. The use of dummy interfaces also allows the centralized controller (or set of controllers) that manages the network to push service policies that depend on routing decisions to all of the SRs, thereby allowing services to be delivered by any of the SRs. Some embodiments, however, do not use dummy interfaces, in which case only one northbound interface is assigned to each SR.

In some embodiments the SRs exchange routing information with the physical network (e.g., using a route advertisement protocol such as BGP or OSPF). One goal of this route exchange is that irrespective of which SR routes a packet towards the physical network, the routing decision should always point to either a local interface of the SR or a dummy interface that corresponds to an uplink of the logical router on a different SR. Thus, the policies associated with the logical router uplink can be applied by the SR even when the uplink is not assigned to that SR, enabling the scale out of stateful services. In some embodiments, when dummy interfaces are used, the routes received from a peer SR will have a larger administrative distance value than routes learned directly from a physical next-hop router, thereby ensuring that a SR will send a packet to its peer SR only when it cannot send the packet directly to a physical network router.

For a logical router that has one or more centralized components, some embodiments configure the SR as follows. For northbound interfaces, the SR has the same number of such interfaces as the logical router, and these interfaces each inherit the IP and MAC address of the corresponding logical router interfaces. A subset of these interfaces are marked as local interfaces (those for which the uplink is assigned to the SR), while the rest of the interfaces are marked as dummy interfaces. In some embodiments, the service policies defined for the logical router are pushed equivalently to all of the SRs, as these are configured in the same way from the network and interface perspective. The dynamic routing configuration for a particular logical router port/uplink are transferred to the local interface of the SR to which that particular uplink is assigned.

Each SR, as mentioned, is assigned a single southbound interface (also a local interface) that connects to a transit logical switch, with each SR's southbound interface connecting to the same transit logical switch. The IP addresses for each of these southbound interfaces is in the same subnet as the northbound interface assigned to the DR (that of the transit logical switch). Some embodiments differentiate the assignment of IP addresses between the SRs depending on whether the SRs are in active-active or active-standby mode. For active-active mode (i.e., when all of the SRs are treated as equals for routing purposes), different IP and MAC addresses are assigned to the southbound interfaces of all of the SRs. On the other hand, in active-standby mode, the same IP is used for both of the southbound interfaces of the two SRs, while each of the interfaces is assigned a different MAC address.

As indicated in the above subsection regarding DRs, users may configure static routes for the logical router. A static route (or a connected route) of the logical router that egresses from an uplink is copied to the RIB of the SR. The distance metric for such a route is unmodified if the uplink through which the route egresses is assigned to the SR; however, if the uplink is a dummy interface on the SR, then some embodiments add a value to this metric so that the SR will prefer a route that egresses from its local interface when the network can be reached without redirecting the packet to a different SR through a dummy interface. In other embodiments, the static routes are only propagated to the SRs to which they apply (e.g., if the SRs have different connectivity to the external network).

In addition, the SRs (of a top-level logical router) may learn dynamic routes and place these in their RIB (though some embodiments perform this locally, without involving the centralized control plane or management plane). In some embodiments, the dynamic routes learned from peer SRs are installed without this adjustment of the distance metric, because by default the metric for routes learned from IBGP (SR to SR peering) or OSPF are larger than the metric for routes learned from EBGP.

For each southbound interface of the logical router, some embodiments add a route for the corresponding network to the RIB of each SR. This route points to the northbound DR interface as its next-hop IP address. Furthermore, any other routes configured for the logical router that egress from the southbound interface are copied to the SR with the same northbound DR interface as the next-hop IP address.

Returning to the example of FIG. 10, as the logical router 915 has two uplinks, the management plane defines two service routers 1010 and 1015. The first service router 1010 has a local interface for U1 and a dummy interface for U2, referred to as U2'. Similarly, the second service router 1015 has a local interface for U2 and a dummy interface, U1', for the first uplink U1. The function of these dummy interfaces is described above, as these interfaces are used to redirect packets to the other SR. Each of these SRs is assigned a southbound interface, with different IP and MAC addresses (as the SRs are in an active-active configuration). The IP addresses IP1 (for the first SR 1010) and IP2 (for the second SR 1015) are in the subnet 192.1.100.0/24, as is IP3 (the northbound interface of the DR 1005).

Using the rules of some embodiments, the RIB for each SR will include a connected route for the subnet of the transit logical switch (192.168.100.0/24), static routes for any applicable user-entered static routes, and static connected routes for the two logical switches (for 1.1.1.0/24 and 1.1.2.0/24) that are attached to the DR 605.

C. Management Plane Processes

Figure 11:
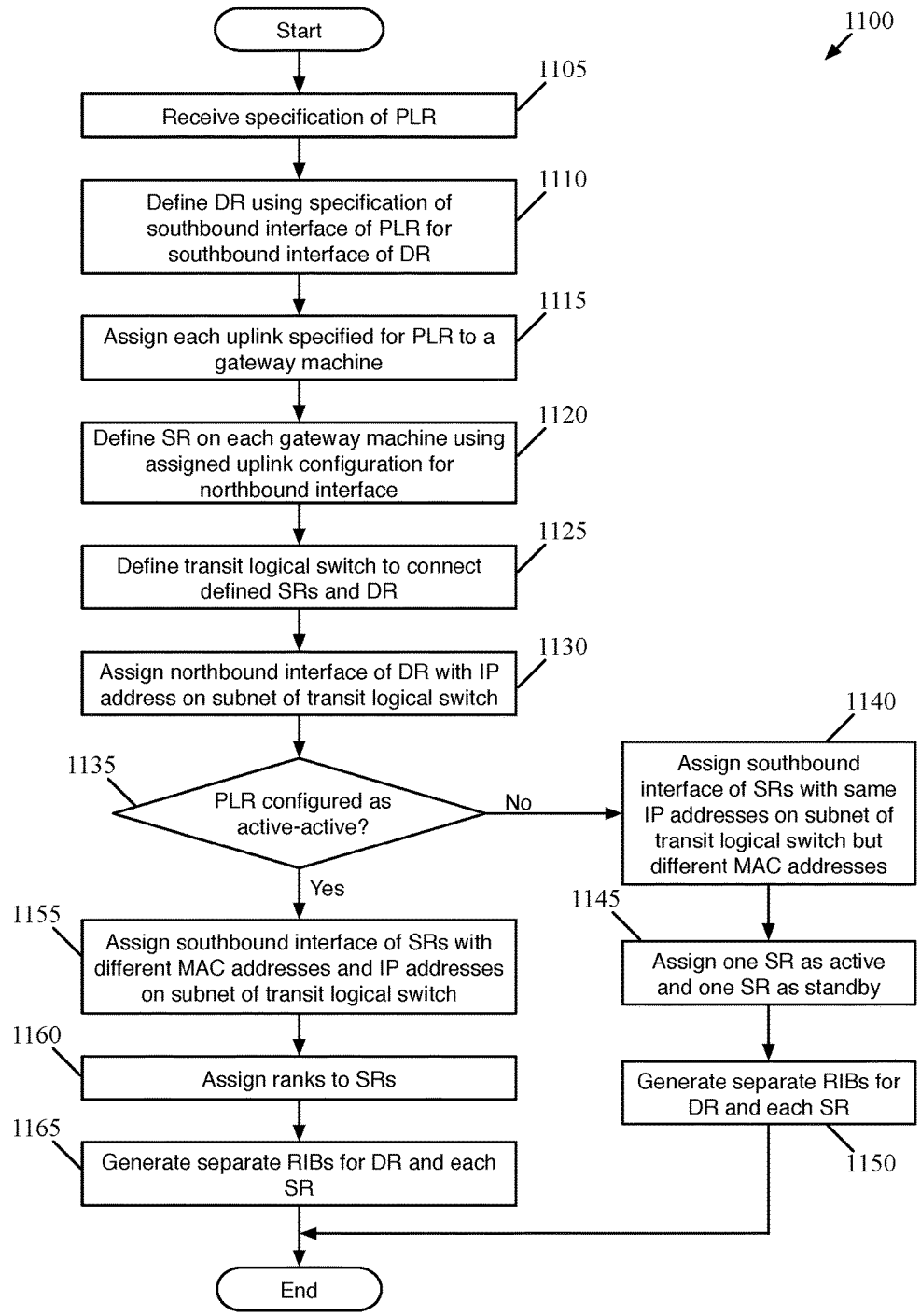
FIG. 11 conceptually illustrates a process of some embodiments for configuring a PLR based on a user specification.

FIG. 11 conceptually illustrates a process 1100 of some embodiments for configuring a PLR based on a user specification. In some embodiments, the process 1100 is performed by the management plane (e.g., the management plane 705). The management plane performs the configuration process, then uses a centralized control plane of the controller (or of a different network controller) to perform the RIB to FIB conversion and distribute the data to various local control planes on the various host machines that implement the configured logical router.

As shown, the process 1100 begins by receiving (at 1105) a specification of a PLR. The specification of a PLR is based on administrator input to define the PLR (e.g., an administrator employed by the owner of the datacenter). In some embodiments, this specification includes definitions of any services the PLR should provide, whether the PLR will be configured in active-active or active-standby mode (though some embodiments automatically use active-active mode unless stateful services are configured), how many uplinks are configured for the PLR, the IP and MAC addresses of the uplinks, the L2 and L3 connectivity of the uplinks, the subnets of any southbound interfaces of the PLR (one interface if the PLR is intended for a two-tier topology, and any number of interfaces if user logical switches will connect directly in a single-tier topology), any static routes for the RIB of the PLR, as well as other data. It should be understood that different embodiments may include different combinations of the listed data or other data in the configuration data for a PLR.

The process 1100 then defines (at 1110) a DR using this configuration data. This assumes that the PLR will not be completely centralized, in which case no DR is generated by the management plane. For the southbound interface of the DR, the management plane uses the southbound interface configuration of the PLR. That is, the IP address and MAC address for the DR are those specified for the logical router.

In addition, the process assigns (at 1115) each uplink specified for the PLR to a gateway machine. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns each of the uplinks to one of the gateway machines in the selected set. Some embodiments allow multiple uplinks to be assigned to the same gateway machine (so long as the logical router does not have only two uplinks configured in active-standby mode), while other embodiments only allow a single uplink per gateway machine for the PLR irrespective of whether in active-active or active-standby.

After assigning the uplinks to gateway machines, the process 1100 defines (at 1120) a SR on each of the selected gateway machines. For each SR, the process uses the configuration for the uplink assigned to that gateway machine as the configuration for the northbound interface of the SR. This configuration information includes the IP and MAC address of the uplink, as well as any uplink-specific policies. It should be understood that, for situations in which different policies and/or L3 connectivity are allowed and used between the different uplinks, some embodiments also configure dummy interfaces on the SRs in order to redirect packets if needed.

The process additionally defines (at 1125) a transit logical switch to connect the defined SRs and DR. In some embodiments, the management plane assigns a unique VNI (logical switch identifier) to the transit logical switch. In addition, some embodiments require that the subnet assigned to the transit logical switch be unique within the logical network topology. As such, the transit logical switch must use a subnet different from any user-defined logical switches that interface directly with the PLR, as well as all transit logical switches between the PLR and any TLRs that connect to the PLR, all transit logical switches within these TLRs, and any user-defined logical switches that connect to these TLRs.

Next, the process 1100 assigns (at 1130) a northbound interface to the DR. The northbound interface, in some embodiments, is assigned both a MAC address and an IP address (used for packets sent internally between the components of the PLR). In some embodiments, the IP address is in the subnet that was assigned to the transit logical switch defined at 1125. The configuration of the transit logical switch includes an association of this MAC address with one of its logical ports.

The process then determines (at 1135) whether the PLR is configured in active-active mode (or active-standby mode). As noted above, in some embodiments, this determination is made by the administrator as part of the configuration settings for the PLR. In other embodiments, the management plane automatically defines the SRs in active-active configuration for PLRs unless stateful services are set up, in which case the SRs are defined in active-standby mode.

When the PLR is configured in active-standby mode, the process assigns (at 1140) southbound interfaces of each of the two SRs (or more than two SRs, if there are multiple standbys). In the active-standby case, these southbound interfaces all have the same IP address, which is in the subnet of the transit logical switch defined at operation 1125. Although the two interfaces receive the same IP address, the MAC addresses assigned are different, so as to differentiate the two as destinations for northbound packets routed by the DR.

The process then assigns (at 1145) one of the SRs as active and one of the SRs as standby. Some embodiments make this determination randomly, while other embodiments attempt to balance the assignment of active and standby SRs across the gateway machines, as described in greater detail in U.S. Patent Publication 2015/0063364, which is incorporated herein by reference. The SR assigned as active will respond to ARP requests for the southbound interface, and will advertise prefixes to the external physical network from its northbound interface. The standby SR, on the other hand, will not respond to ARP requests (so as to avoid receiving northbound traffic), and will not advertise prefixes (but will maintain a BGP session in order to receive routes from the external network in case of failure of the active SR.

Lastly, the process 1100 generates (at 1150) separate RIBs for the DR and for each of the SRs. The separate RIBs are generated based on the configuration data in the manner described in the previous subsections, as well as below in Section III. The process then ends. In some embodiments, the central control plane also calculates the FIB centrally, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

On the other hand, when the PLR is configured in active-active (ECMP) mode, the process assigns (at 1155) southbound interfaces of each of the SRs. In the active-active cases, these southbound interfaces are each assigned different IP addresses in the subnet of the transit logical switch defined at operation 1125, as well as different MAC addresses. With different IP addresses, each of the SRs can handle northbound packets based on the IP address selected for a given packet by the DR pipeline in a host machine.

Next, the process assigns (at 1160) ranks to the SRs. As described in detail below, the SRs use the ranks in case of failover to determine which SR will take over responsibilities for a failed SR. In some embodiments, the next-highest ranked SR takes over for a failed SR by taking over its southbound interfaces so as to attract northbound traffic that would otherwise be sent to the IP address of the failed SR.

Finally, the process generates (at 1165) separate RIBs for the DR and for each of the SRs. The separate RIBs are generated based on the configuration data in the manner described in the previous subsections, as well as below in Section III. The process then ends. In some embodiments, the central control plane also calculates the FIB, while in other embodiments the local control planes (operating on the host and gateway machines) performs the RIB traversal to generate the FIB to use in actual forwarding of packets by the logical router components. In either case, the RIB is updated on the SRs based on the dynamic routes learned from the external network, and that data is propagated to the DR via central controllers.

Figure 12:
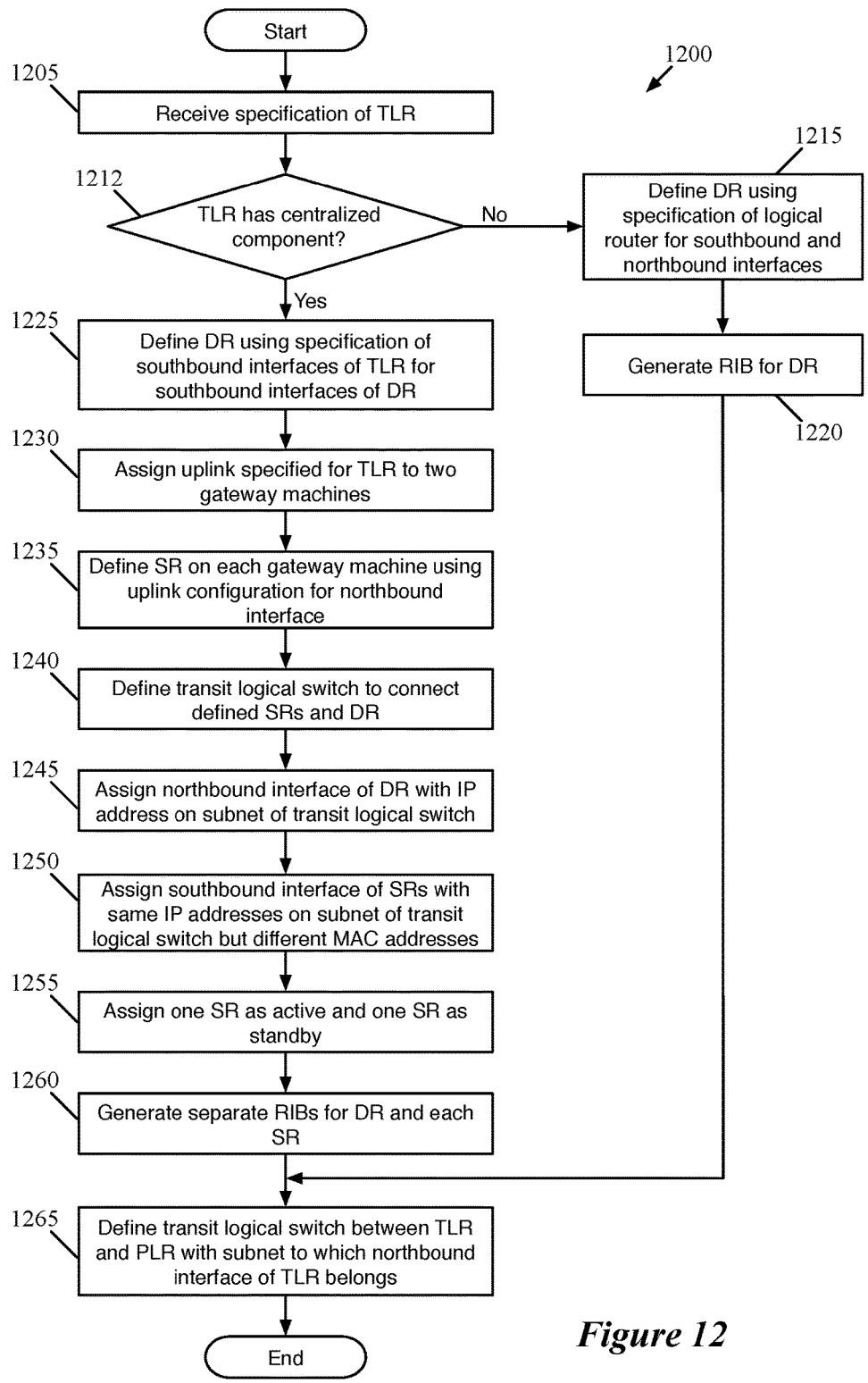
FIG. 12 conceptually illustrates a process of some embodiments for configuring a TLR based on a user specification.

The above description of FIG. 11 indicates the operations of the management plane to generate the various components for a PLR (upper tier logical router). FIG. 12 conceptually illustrates a process 1200 of some embodiments for configuring a TLR based on a user specification. In some embodiments, the process 1200 is performed by the management plane (e.g., a set of modules at a centralized controller that manages the networks of a datacenter). The management plane performs the configuration process, then uses a centralized control plane of the controller (or a different network controller) to distribute the data to various local control planes on the various host machines that implement the configured logical router.

As shown, the process begins by receiving (at 1205) a specification of a TLR. The specification of a TLR is based on administrator input to define the TLR (e.g., an administrator employed by a tenant of the datacenter). In some embodiments, this specification includes definitions of any services the TLR should provide, which PLR the TLR should connect to through its uplink, any logical switches that connect to the TLR, IP and MAC addresses for the interfaces of the TLR, any static routes for the RIB of the TLR, as well as other data. It should be understood that different embodiments may include different combinations of the listed data or other data in the configuration data for the TLR.

The process 1200 then determines (at 1210) whether the TLR has a centralized component. In some embodiments, if the TLR does not provide stateful services, then no SRs are defined for the TLR, and it is implemented only in a distributed manner. On the other hand, some embodiments require SRs in active-standby mode when stateful services are provided, as shown in this figure.

When the TLR does not provide stateful services or otherwise require a centralized component, the process defines (at 1215) a DR using the specification of the logical router for both the southbound and northbound interfaces. The DR may have numerous southbound interfaces, depending on how many logical switches are defined to connect to the TLR. On the other hand, some embodiments restrict TLRs to a single northbound interface that sends packets to and receives packets from a PLR. The process also generates (at 1220) a RIB for the DR. The RIB for the DR will include all of the routes for the logical router, generated as described above.

On the other hand, when the TLR provides stateful services or requires a centralized component for other reasons, the process defines (at 1225) a DR using the received configuration data. For the southbound interfaces of the DR, the management plane uses the southbound interface configurations of the TLR. That is, the IP address and MAC address for each southbound interface are those specified for the ports of the logical router to which the various logical switches couple.

In addition, the process assigns (at 1230) the uplink specified for the TLR to two gateway machines. While some embodiments allow TLRs to operate in active-active mode with multiple uplinks, the process 1200 is for embodiments that restrict the TLRs to a single uplink (also referred to as a router link, as the link interconnects the TLR to another logical router) in active-standby mode. As described above, some embodiments allow (or require) the user to specify a particular set of physical gateway machines for the location of the SRs of the logical router. In some embodiments, the set of gateway machines might be together within a particular rack or group of racks of servers, or are otherwise related, with tunnels connecting all of the machines in a set. The management plane then assigns the uplink to two of the gateway machines in the selected set.

After assigning the uplinks to gateway machines, the process 1200 defines (at 1235) a SR on each of the two gateway machines. For each SR, the management plane uses the configuration for the single uplink as the configuration for the northbound interface of the SR. As there is only one northbound interface, the process applies the same configuration to both of the SRs. That is, not only is the same IP address used for both northbound interfaces, but the services on the interfaces are configured in the same manner as well. However, different MAC addresses are used for the northbound interfaces, so as to differentiate the active and standby SRs.

The process additionally defines (at 1240) a transit logical switch to connect the defined SRs and DR. In some embodiments, the management plane assigns a unique VNI (logical switch identifier) to the transit logical switch. In addition, some embodiments require that the subnet assigned to the transit logical switch be unique among the logical network topology. As such, the management plane must assign the transit logical switch a subnet different than any of the user-defined logical switches that interface with the TLR, as well as any transit logical switches between the TLR (or other TLRs) and the PLR, as well as all transit logical switches within other TLRs that connect to the same PLR, the transit logical switch within the PLR, and the user-defined logical switches that connect to the other TLRs.

Next, the process assigns (at 1245) a northbound interface to the DR. This interface, in some embodiments, is assigned both a MAC address and an IP address (used for packets sent internally between the components of the TLR). In some embodiments, the IP address is in the same subnet that was assigned to the transit logical switch at 1140. The process also assigns (at 1250) southbound interfaces of each of the two SRs. As this is an active-standby configuration, these southbound interfaces have the same IP address, which is in the subnet of the transit logical switch defined at operation 1140. Although the two interfaces receive the same IP address, the MAC addresses assigned are different, so as to differentiate the two as destinations for northbound packets routed by the DR.

The process 1200 then assigns (at 1255) one of the SRs as active and one of the SRs as standby. Some embodiments make this determination randomly, while other embodiments attempt to balance the assignment of active and standby SRs across the gateway machines. The SR assigned as active will respond to ARP requests for the southbound (from the DR of this TLR) and northbound (from the DR of the PLR) interfaces. The standby SR, on the other hand, will not respond to ARP requests (so as to avoid receiving northbound or southbound traffic).

Next, the process generates (at 1260) separate RIBs for the DR and for each of the SRs. The separate RIBs are generated based on the configuration data in the manner described in the previous subsections, as well as below in Section III. In some embodiments, the central control plane also calculates the FIB centrally, while in other embodiments the local control planes (operating on the host and gateway machines) perform the RIB traversal to generate the FIB to use in actual forwarding of packets by the logical router components. In either case, the RIB is updated on the SRs based on the dynamic routes learned from the external network, and that data is propagated to the DR via central controllers.

Irrespective of whether the TLR is generated with or without SRs, the process 1200 defines (at 1265) another transit logical between the TLR and the PLR to which it connects. This transit logical switch has a unique VNI, and a subnet to which the uplink IP address of the TLR belongs. In addition, an interface on the DR of the PLR is created in the same subnet to connect to the transit logical switch. The process then ends.

It should be understood that while the processes 1100 and 1200 illustrate a specific order for performing these various operations, these processes are merely conceptual. In various different embodiments, the management plane may perform the actual operations in various different orders, or even perform some of the operations in parallel. For instance, the management plane could define the transit logical switch first, prior to defining the SR or DR at all, could define all of the logical router components completely before assigning them to separate physical machines, etc.

III. RIB to FIB Conversion

As indicated above, in some embodiments the management plane receives a logical router configuration and generates (i) one or more logical router constructs for each logical router and (ii) a routing information base (RIB) for each logical router construct. In some embodiments, the calculation of a forwarding information base (FIB) from the RIB may be performed by the centralized control plane, as shown in FIG. 7. The FIB is then distributed with the routing component configuration data to the local controllers, which convert this into forwarding data in a format usable by the managed forwarding elements.

Figure 13:
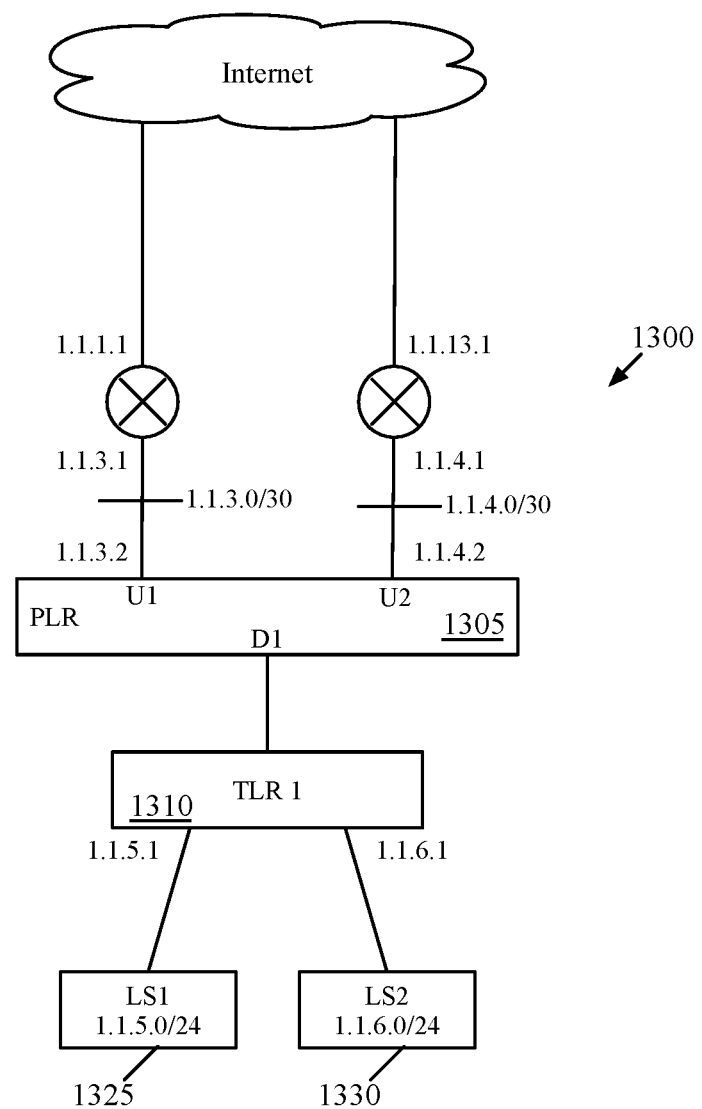
FIG. 13 conceptually illustrates a logical network configuration.

The central control plane processes will be described in part by reference to an example shown in FIGS. 13-16. FIG. 13 conceptually illustrates a logical network configuration 1300 that will be used to illustrate the RIB generation and RIB to FIB conversion of some embodiments. Specifically, the logical network configuration 1300 includes a PLR 1305 to which a TLR 1310 attaches. The TLR 1310 has two logical switches 1325 and 1330 attached, which are assigned subnets 1.1.5.0/24 and 1.1.6.0/24. The PLR 1305 has two uplinks configured (U1 and U2), which are correspondingly on subnets 1.1.3.0/30 and 1.1.4.0/30, having IP addresses 1.1.3.1 and 1.1.3.2, and each connect to a different logical router on their respective subnets.

Figure 14:
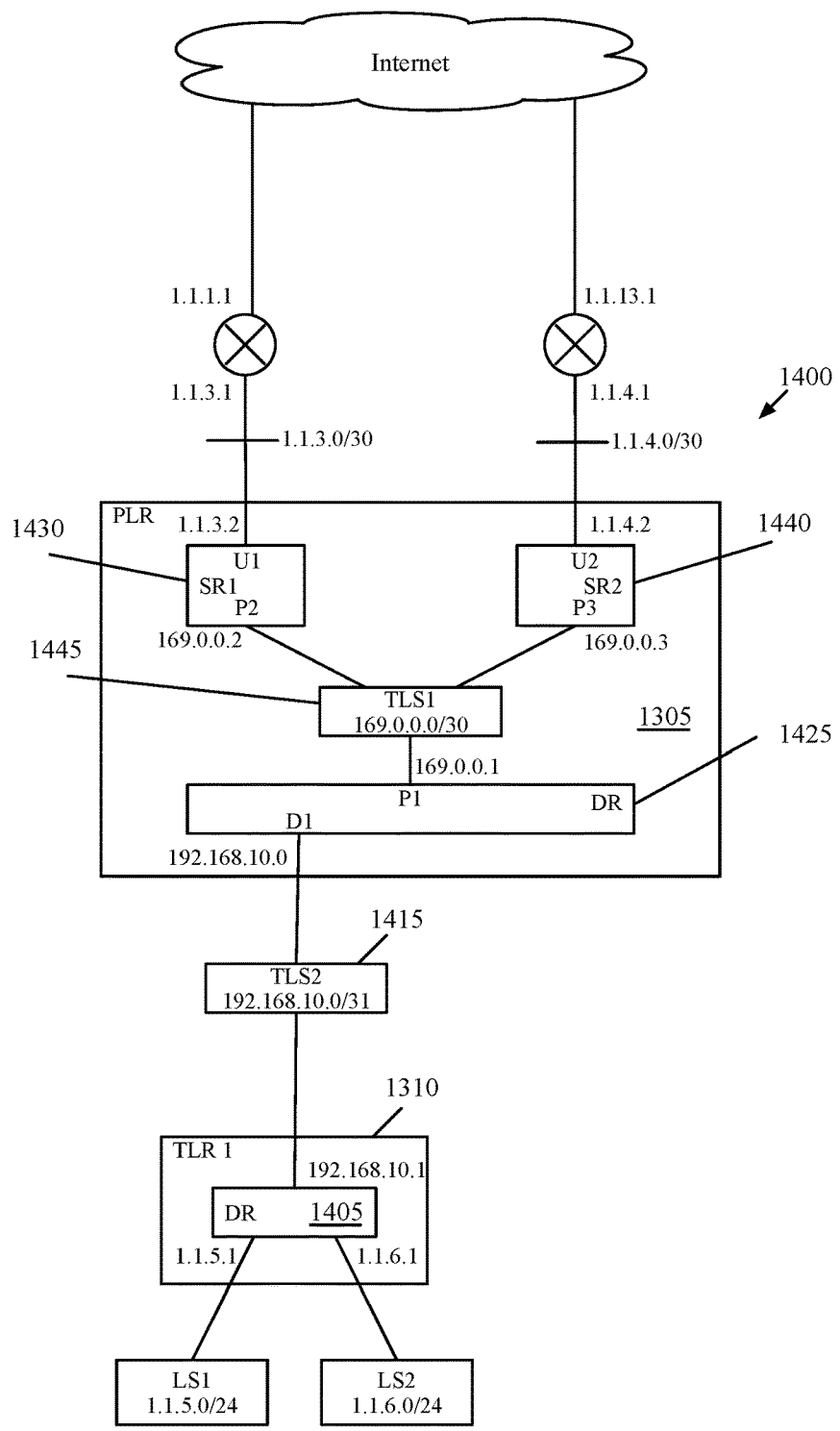
FIG. 14 conceptually illustrates a management plane view of the logical network configuration of FIG. 13.

This data is received by the management plane, which defines logical routing components for the logical routers and generates routing tables (RIBs) for each component. FIG. 14 conceptually illustrates this management plane view 1400 of the logical network configuration 1300. In this case, the TLR 1310 does not have any stateful services, so only a DR 1405 is defined, with two downlink interfaces that connect to the two logical switches. In addition, the uplink (or router link) on this DR connects to a transit logical switch 1415 created by the management plane. This transit logical switch 1415 has a subnet 192.168.10.0/31. The transit logical switches between PLRs and TLRs can be assigned "/31" subnets, as only 2 IP addresses are required so long as the TLR does not have SRs operating in active-active mode. The north-facing port of the DR 1405 is assigned the address 192.168.10.1, while the downlink on the DR 1425 (of the PLR) is assigned the address 192.168.10.0.

The management plane also defines the DR 1425 and two SRs 1430 and 1440 (one for each uplink) for the PLR 1305. The DR 1425 has the one south-facing interface for the TLR 1310, in addition to an interface P1 defined by the management plane. This interface P1 connects to a transit logical switch 1445 with a subnet 169.0.0.0/30, to which south-facing interfaces P2 and P3 of the three SRs 1430 and 1440 also connect. These three interfaces P1-P3 have, in turn, IP addresses of 169.0.0.1, 169.0.0.2, and 169.0.0.3. Each of the uplinks U1 and U2 is defined on one of the SRs (no dummy interfaces are defined in this example).

Figure 15:
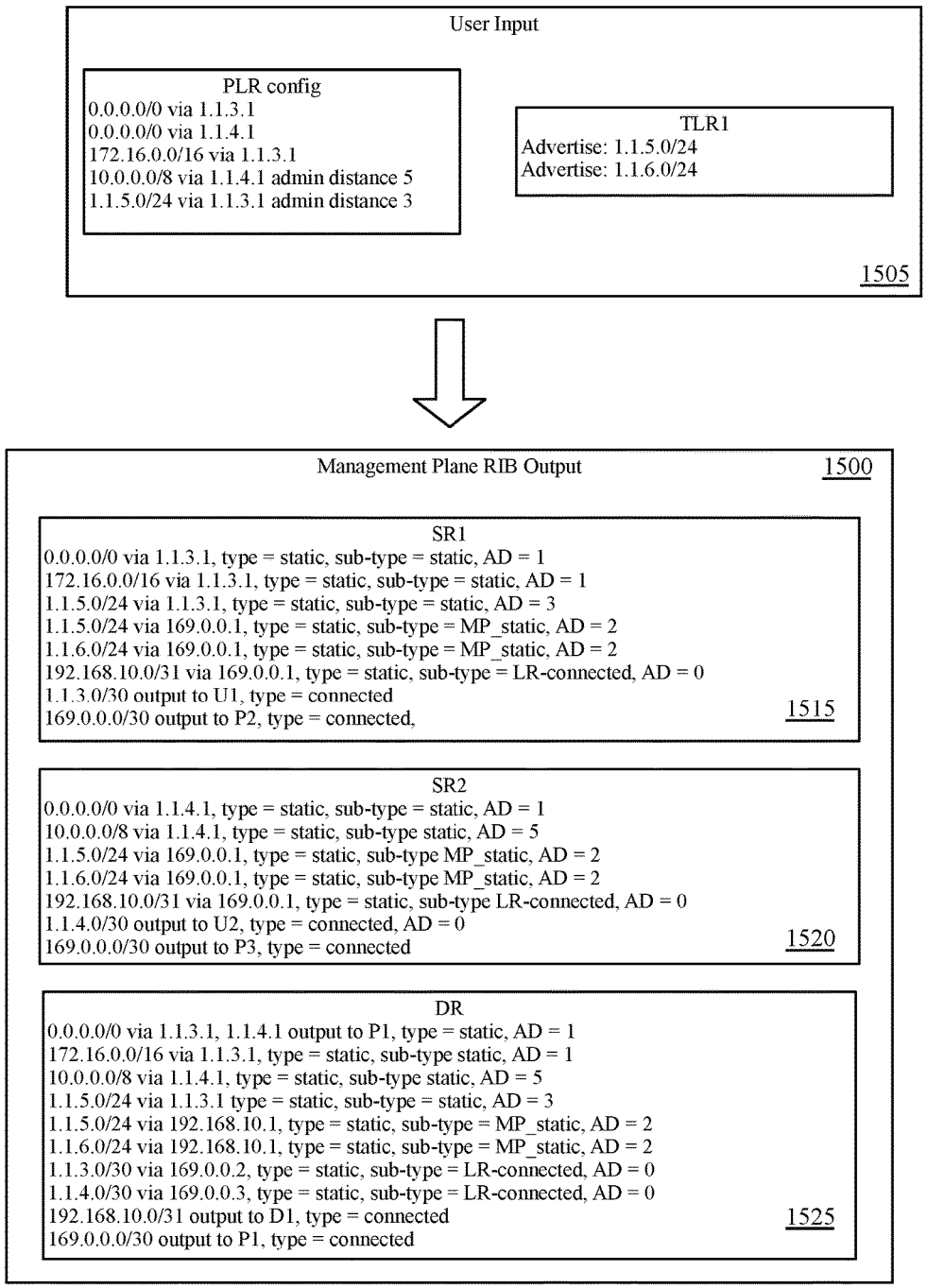
FIG. 15 illustrates additional administrator configuration input for the PLR and TLR of FIG. 13, and generated RIBs for each of the routing components of the PLR.

FIG. 15 illustrates the additional administrator configuration input 1505 for the PLR 1305 and TLR 1310, and the generated RIBs 1515-1525 for each of the routing components 1425, 1430, and 1440 of the PLR. Specifically, the administrator of the PLR defines default static routes for each physical router connection (in some embodiments, these are automatically defined) of 0.0.0.0/0 via 1.1.3.1 and 0.0.0.0 via 1.1.4.1. In addition, three other static routes are defined by the PLR administrator, which specify to which physical router (and therefore through which SR) certain traffic should be sent. These routes are 172.16.0.0/16 via 1.1.3.1, 10.0.0.0/8 via 1.1.4.1, and 1.1.5.0/24 via 1.1.3.1. For the latter two routes, the administrator also specifies administrative distances, to override the default values of 1 for user-entered static routes. The TLR configuration details shown indicate prefixes for the TLR to advertise. In this case, the TLR 1310 advertises routes for both of its connected logical switches, 1.1.5.0/24 and 1.1.6.0/24.

The management plane processes this configuration data 1505 as well as the input logical network configuration 1300 to generate RIB output 1500 for each of the routing components of the PLR (the RIB for the DR 1405 of the TLR 1310 is not shown). The RIB 1515 for the first SR 1430 includes eight routes in this simplified example. The first route (the order of the routes is not meaningful) is the default route 0.0.0.0/0 via 1.1.3.1, which is classified as a static route with the sub-type static, and therefore has an administrative distance of 1. The other static routes with next hop addresses of 1.1.3.1 are also added to the RIB 1515—the route for 172.16.0.0/16 has the default administrative distance, but the route for 1.1.5.0/24 has an administrative distance of 3 as the administrator specifies this value through the configuration data.

The RIB 1515 also includes static routes of sub-type MP_static for the advertised routes from the TLR, for 1.1.5.0/24 and 1.1.6.0/24. These routes are automatically propagated to the SRs with the northbound facing interface of the DR as the next hop, and have a default administrative distance of 2. In addition, a route for the transit logical switch 192.168.10.0/31 connected to the DR is added to the SR RIB 1515, as a static route of sub-type LR-connected, with an administrative distance of 0. Lastly, two connected routes are defined that specify output interfaces, with the uplink U1 connected to the subnet 1.1.3.0/30 and the internal southbound interface P2 connected to the transit logical switch subnet 169.0.0.0/30.

The RIB 1520 for the second SR 1440 includes seven routes, because there is one fewer user-entered static route with a next hop of 1.1.4.1. Specifically, the RIB 1520 includes a default route 0.0.0.0/0 via 1.1.4.1 and the other static route 10.0.0.0/8 via 1.1.4.1, with the latter having an administrative distance of 5. The same two static routes for 1.1.5.0/24 and 1.1.6.0/24 with sub-type MP_static as in the RIB 1515 are also present, as well as the static sub-type LR-connected route for 192.168.10.0/31. Lastly, two connected routes are defined that specify output interfaces, with the uplink U2 connected to the subnet 1.1.4.0/30 and the internal southbound interface P3 connected to the transit logical switch subnet 169.0.0.0/30.

For the RIB 1525 of the DR, all five of the user-entered static routes are present. Some embodiments add these routes as specified, with the user-entered next hop IP addresses (as shown in the figure). On the other hand, some embodiments automatically use the appropriate southbound SR interface (or interfaces, if multiple SRs have the same external connectivity) for the next hop IP addresses. The RIB 1525 also has static sub-type MP_static routes for each of the advertised prefixes 1.1.5.0/24 and 1.1.6.0/24, as well as static sub-type LR-connected routes for the external subnets 1.1.3.0/30 and 1.1.4.0/30. Lastly, the DR has two connected routes, for its internal interface P1 and its southbound interface with the TLR, D1.

Figure 16:
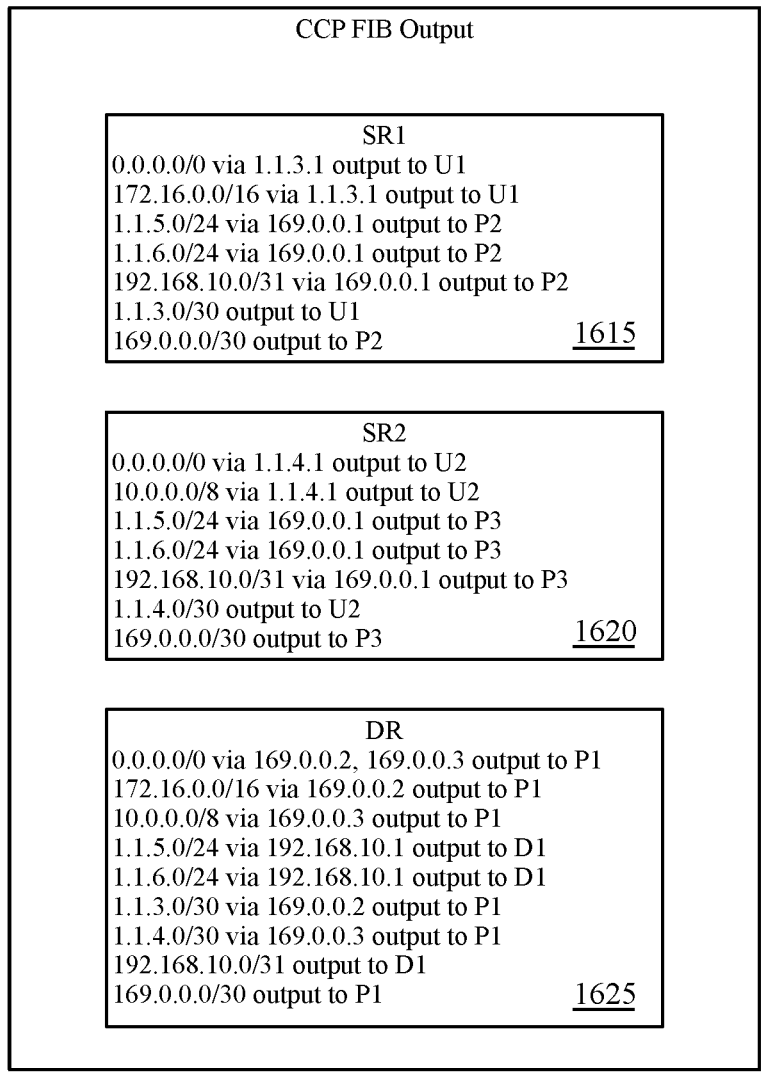
FIG. 16 illustrates the resulting FIBs for each of the three routing components of the PLR.

FIG. 16 illustrates the resulting FIBs 1615-1625 for each of these three routing components 1425, 1430, and 1440, and will be used to explain the central control plane processes for converting a routing component RIB into a FIB that can be used to configure MFEs implementing the logical routing component.

Figure 17:
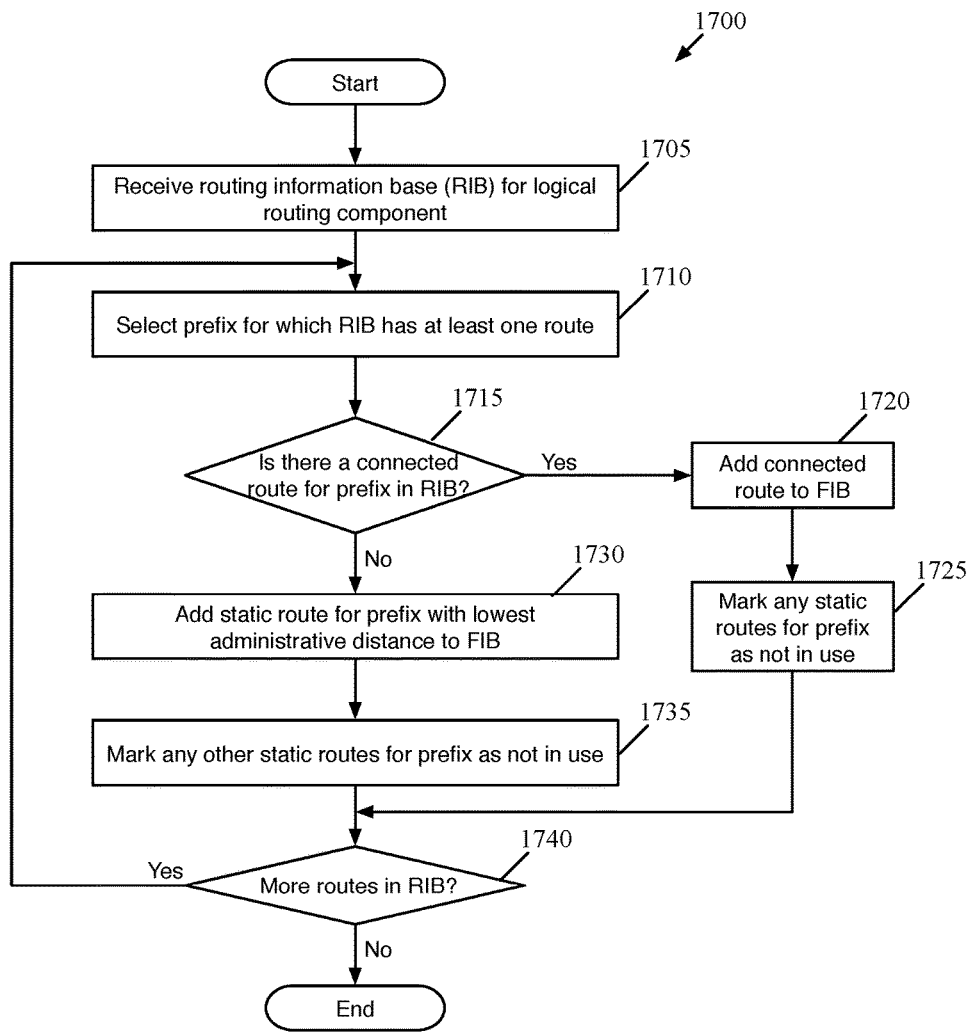
FIG. 17 conceptually illustrates a process of some embodiments for identifying which RIB routes to include in a routing component FIB.

FIG. 17 conceptually illustrates a process 1700 of some embodiments for identifying which RIB routes to include in a routing component FIB. In some embodiments, this process is performed by a central control plane operating in a central network controller. As shown, the process 1700 begins by receiving (at 1705) a routing information base (RIB) for a logical routing component. This might be a DR or a SR, and could belong to a PLR or TLR. The RIB of some embodiments is generated by the management plane, according to configuration data received from an administrator of the logical router through an API.

The process 1700 then selects (at 1710) a prefix for which the RIB has at least one route. While the automatically-generated routes should not create multiple routes for the same prefix (so long as the various logical switch subnets of the logical network are assigned correctly), user-entered static routes may overlap with the automatically-generated routes. In the example, the RIB 1515 includes an automatically-generated MP_static route for 1.1.5.0/24 as well as a user-entered static route for this same prefix.

The process determines (at 1715) whether a connected route for the prefix exists in the RIB. In some embodiments, connected routes take precedence over all other routes. As such, when a connected route exists in the RIB for a prefix, the process adds (at 1720) this route to the FIB. The process also marks (at 1725) any static routes for the selected prefix as not in use. Such routes will not be added to the FIB. In the example of FIGS. 15 and 16, all of the connected routes from RIBs 1515-1525 are added to the respective FIBs 1615-1625. Because only one route for any given prefix will be added to the RIB, no administrative distance metrics are required in some embodiments.

When no connected route exists in the RIB for a selected prefix, the process adds (at 1730) the static route for the prefix with the lowest administrative distance to the FIB, and marks (at 1735) any other static routes for that prefix as not in use. Because this process is performed by the central control plane for an initial router configuration, only static and connected routes are possible. Some embodiments also incorporate dynamic routes learned by the SRs through route exchange protocols (e.g., BGP, OSPF, etc.) with external physical routers. In the example figure, the RIB 1515 has both a user-entered static route for 1.1.5.0/24 as well as an automatically-generated MP_static route for this prefix. Because the user-entered static route has a (non-default) administrative distance value of 3, the MP_static route with a next hop of 169.0.0.1 is preferred for the FIB 1615. The RIB 1525 for the DR also has two routes for 0.0.0.0/0 (i.e., two next hop IP addresses), which share the same administrative distance. In this case, both routes are added to the FIB and equal-cost multi-path (ECMP) routing will be used to select one of the next hop addresses.

Figure 18:
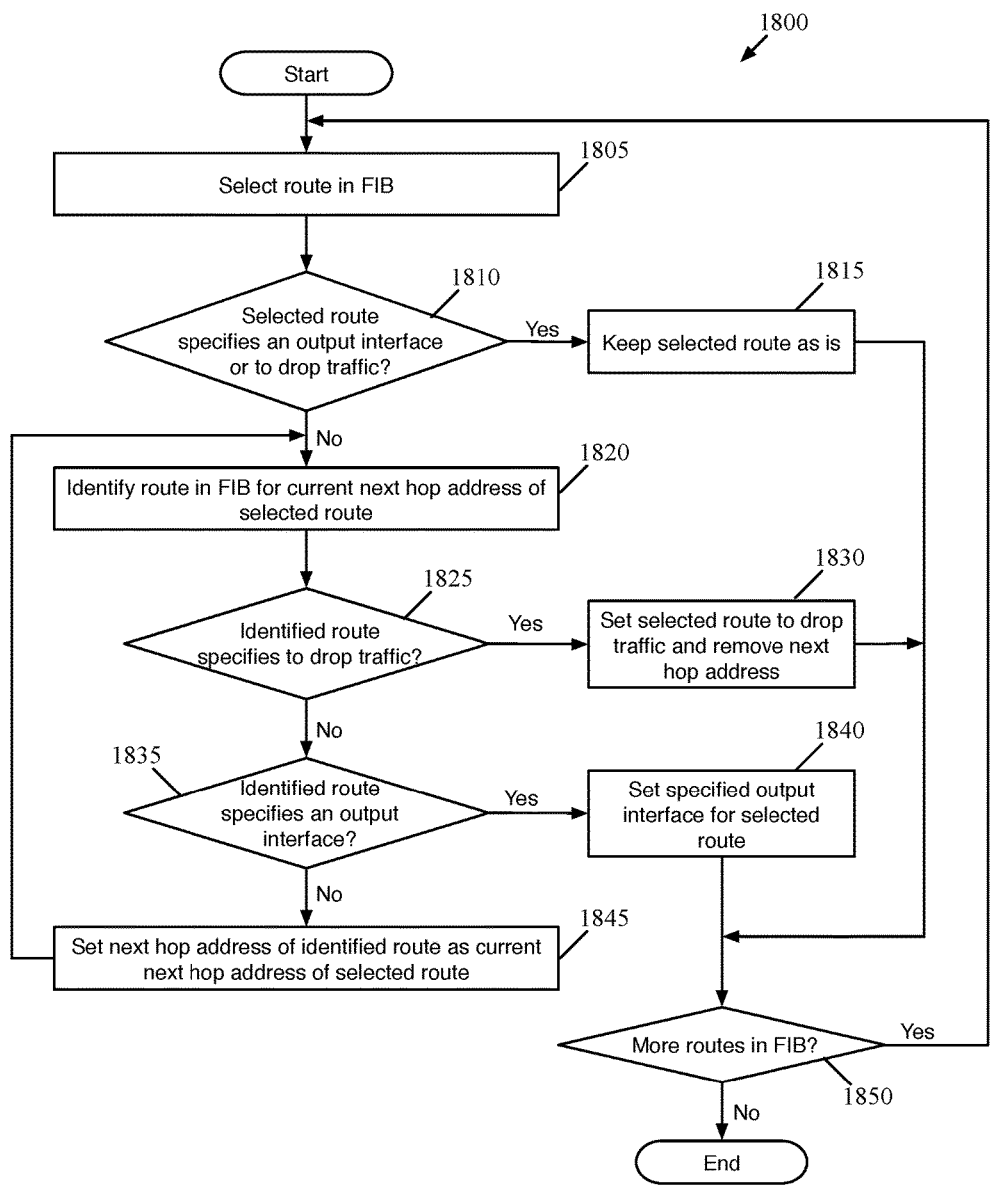
FIG. 18 conceptually illustrates a process of some embodiments for performing route traversal to identify actions for each route in a FIB.

In addition to identifying a single route for each prefix, the central control plane performs route traversal in some embodiments so that each route specifies an action (either dropping a packet or outputting the packet to a specific interface). FIG. 18 conceptually illustrates a process 1800 of some embodiments for performing route traversal to identify actions for each route in a FIB. The process 1800 is performed, in some embodiments, by a central control plane. In some embodiments, the central control plane performs the processes 1700 and 1800 as a single process for calculating a FIB from a provided RIB.

As shown, the process 1800 begins by selecting (at 1805) a route in the FIB. As this process 1800 is performed after the process 1700, the FIB has been narrowed down to a single route per prefix. The process then determines (at 1810) whether the selected route specifies an output interface or to drop traffic sent to addresses in the prefix. Both of these options are final actions that indicate how to process a received packet. As such, when such an action is specified by the route, the process keeps (at 1815) the selected route as is and proceeds to 1850, which is described below. While the example does not include any routes specifying to drop traffic, the connected routes for each of the routing components specify output interfaces. As such, these routes are added to the FIB unmodified.

However, when the selected route does not specify such a final action (instead specifying only a next hop address), the process performs route traversal to identify a final action (e.g., either a next hop address and output interface, or a drop action). The process 1800 identifies (at 1820) a route in the FIB for the current next hop address of the selected route. For instance, the RIB 1515 includes a route 192.168.10.0/31 via 169.0.0.1. In this case the next hop address is 169.0.0.1, and the route traversal process identifies the route for 169.0.0.0/30 as the route for this next hop address (i.e., this is the most specific route matched by the address, or the route for the longest matching prefix).

The process 1800 then determines (at 1825) whether the identified route specifies to drop traffic matching the prefix. If so, the process sets (at 1830) the selected route to drop traffic (i.e., so that the route specifies a drop action) and removes the next hop address from the route. When a router drops a packet, the next hop address is not used and thus need not be stored as part of the configuration data. The process then proceeds to 1850. As mentioned, in the example, none of the routes specify a drop action.

If the identified route for the current next hop address does not specify a drop action, the process determines (at 1735) whether the identified route specifies an output interface (i.e., whether the route specifies a logical router port to which to output packets). In the example, all of the connected routes specify output interfaces (i.e., the port of the routing component to which the routed subnet is connected). When an output interface is specified, the process sets (at 1840) the specified output interface for the selected route, and proceeds to 1850. For instance, the route 10.0.0.0/8 via 1.1.4.1 in the RIB 1520 becomes 10.0.0.0/8 via 1.1.4.1 output to U2 in the FIB 1620 because 1.1.4.1 matches the route 1.1.4.0/30 output to U2.

However, if the identified route for the current next hop address does not specify either a drop action or an output interface, then the route must specify a next hop address, which is not dispositive. Thus, the process sets (at 1845) the next hop address of the identified route as the current next hop address of the selected route (for which a final action is being determined), then proceeds to 1820 to determine whether a final action can be identified using the new next hop address. As an example, the route 10.0.0.0/8 via 1.1.4.1 in the RIB 1525 becomes 10.0.0.0/8 via 169.0.0.3 output to P1 in the FIB 1530. The next hop address 1.1.4.1 matches the route 1.1.4.0/30 via 169.0.0.3, which only specifies a next hop address. This next hop address 169.0.0.3 is used as the next hop address for the route for 10.0.0.0/8, and it matches the route 169.0.0.0/30 output to P1, which is a final action for the route.

Once an action is identified for the route, the process determines (at 1850) whether more routes remain in the FIB for processing. Once all routes have final actions, the process 1800 ends.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 19 conceptually illustrates an electronic system 1900 with which some embodiments of the invention are implemented. The electronic system 1900 can be used to execute any of the control, virtualization, or operating system applications described above. The electronic system 1900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieve instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory is a volatile read-and-write memory, such a random access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieve instructions to execute and data to process in order to execute the processes of some embodiments.

The bus 1905 also connects to the input and output devices 1940 and 1945. The input devices enable the user to communicate information and select commands to the electronic system. The input devices 1940 include alphanumeric keyboards and pointing devices (also called "cursor control devices"). The output devices 1945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 11, 12, 17, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for implementing a first logical router of a logical network, the method comprising:
   receiving a configuration for the first logical router, the configuration comprising a static route for the first logical router;
   defining a plurality of logical routing components with separate routing tables for the first logical router, the plurality of logical routing components comprising a distributed routing component and at least one centralized routing component, wherein the distributed routing component is implemented by a plurality of managed forwarding elements;
   adding a static first route for the static route to the routing tables of at least a first subset of the routing components of the first logical router, the static first added route having a first static route type; and based on a connection of a second logical router to the first logical router:

defining a logical switch that connects to the distributed routing component of the first logical router and a logical routing component of the second logical router, the logical switch having an assigned subnet;

adding a connected second route for the assigned subnet to the routing table of the distributed routing component; and adding a static third route for the assigned subnet to the routing tables of the centralized routing components of the first logical router, the static third added route having a second static route type different from the first static route type; and distributing the routing tables of the plurality of logical routing components to the plurality of managed forwarding elements, wherein the managed forwarding elements use routes in the distributed routing tables to process network traffic.

2. The method of claim 1, wherein the first static route type and the second static route type have different default priorities.

3. The method of claim 1, wherein the first static route type and the second static route type have different default administrative distances.

4. The method of claim 1, wherein the static first route is added to the distributed routing component and only one of the centralized routing components of the first logical router.

5. The method of claim 1, wherein the static first route is added to all of the logical routing components of the first logical router.

6. The method of claim 1, wherein the second logical router advertises a second subnet for which the second logical router is a next hop, the method further comprising adding a static fourth route to the routing tables of at least a third subset of the routing components, the static fourth route having a third static route type different from the first and second static route types.

7. The method of claim 6, wherein the third static route type has a different default administrative distance than both the first static route type and the second static route type.

8. The method of claim 1, wherein the method is performed by a management plane of a network controller, wherein distributing the routing tables comprises providing the routing tables to a central control plane of the network controller that uses the routing tables to generate a forwarding information base for each of the logical routing components and distributes the generated forwarding information bases to the managed forwarding elements.

9. The method of claim 8, wherein the central control plane identifies a preferred route in a particular routing table for each network address prefix for which at least one route is present in the particular routing table and performs route traversal to identify an output action for the route.

10. A non-transitory machine readable medium storing a program for execution by at least one processing unit, the program comprising sets of instructions for:

receiving a configuration for a first logical router, the configuration comprising a static route for the first logical router;

defining a plurality of logical routing components with separate routing tables for the first logical router, the plurality of logical routing components comprising a distributed routing component and at least one centralized routing component, wherein the distributed routing component is implemented by a plurality of managed forwarding elements;

adding a static first route for the static route to the routing tables of at least a first subset of the routing components of the first logical router, the static first added route having a first static route type; and based on a connection of a second logical router to the first logical router:

defining a logical switch that connects to the distributed routing component of the first logical router and a logical routing component of the second logical router, the logical switch having an assigned subnet;

adding a connected second route for the assigned subnet to the routing table of the distributed routing component; and adding a static third route for the assigned subnet to the routing tables of the centralized routing components of the first logical router, the static third added route having a second static route type different from the first static route type; and distributing the routing tables of the plurality of logical routing components to the plurality of managed forwarding elements, wherein the managed forwarding elements use routes in the distributed routing tables to process network traffic.

11. The non-transitory machine readable medium of claim 10, wherein the first static route type and the second static route type have different default priorities.

12. The non-transitory machine readable medium of claim 10, wherein the first static route type and the second static route type have different default administrative distances.

13. The non-transitory machine readable medium of claim 10, wherein the static first route is added to the distributed routing component and only one of the centralized routing components of the first logical router.

14. The non-transitory machine readable medium of claim 10, wherein the static first route is added to all of the logical routing components of the first logical router.

15. The non-transitory machine readable medium of claim 10, wherein the second logical router advertises a second subnet for which the second logical router is a next hop, the program further comprising a set of instructions for adding a static fourth route to the routing tables of at least a third subset of the routing components, the static fourth route having a third static route type different from the first and second static route types.

16. The non-transitory machine readable medium of claim 15, wherein the third static route type has a different default administrative distance than both the first static route type and the second static route type.

17. The non-transitory machine readable medium of claim 10, wherein the program is a management plane of a network controller, wherein the set of instructions for distributing the routing tables comprises a set of instructions for providing the routing tables to a central control plane of the network controller that uses the routing tables to generate a forwarding information base for each of the logical routing components and distributes the generated forwarding information bases to the managed forwarding elements.

18. The non-transitory machine readable medium of claim 17, wherein the central control plane identifies a preferred route in a particular routing table for each network address prefix for which at least one route is present in the particular routing table and performs route traversal to identify an output action for the route.

* * * * *